United States Patent
Schlanger

(10) Patent No.: US 11,667,148 B2
(45) Date of Patent: Jun. 6, 2023

(54) RIM REINFORCEMENT FITTING

(71) Applicant: Raphael Schlanger, Wilton, CT (US)

(72) Inventor: Raphael Schlanger, Wilton, CT (US)

(*) Notice: Subject to any disclaimer, the term of this patent is extended or adjusted under 35 U.S.C. 154(b) by 309 days.

(21) Appl. No.: 16/988,666

(22) Filed: Aug. 9, 2020

(65) Prior Publication Data
US 2021/0039429 A1 Feb. 11, 2021

Related U.S. Application Data

(60) Provisional application No. 62/884,684, filed on Aug. 9, 2019.

(51) Int. Cl.
*B60B 1/04* (2006.01)
*B60B 1/14* (2006.01)
*B60B 21/06* (2006.01)

(52) U.S. Cl.
CPC ............... *B60B 1/044* (2013.01); *B60B 1/14* (2013.01); *B60B 21/06* (2013.01); *B60B 1/041* (2013.01); *B60B 21/062* (2013.01); *B60B 2200/47* (2013.01); *B60B 2320/50* (2013.01); *B60B 2900/111* (2013.01); *B60B 2900/112* (2013.01); *B60B 2900/121* (2013.01); *B60B 2900/212* (2013.01); *B60B 2900/30* (2013.01); *B60B 2900/311* (2013.01); *B60B 2900/321* (2013.01)

(58) Field of Classification Search
CPC .......... B60B 1/044; B60B 1/041; B60B 1/14; B60B 1/045; B60B 21/06; B60B 21/062; B60B 2320/50
See application file for complete search history.

(56) References Cited

U.S. PATENT DOCUMENTS

| | | | |
|---|---|---|---|
| 546,320 A * | 9/1895 | Goodrich | B60B 21/062 301/58 |
| 6,036,279 A * | 3/2000 | Campagnolo | B60B 1/048 301/58 |
| 7,427,112 B2 | 9/2008 | Schlanger | |

(Continued)

FOREIGN PATENT DOCUMENTS

| | | | | |
|---|---|---|---|---|
| DE | 102008048453 A1 | * | 10/2009 | .......... B60B 1/041 |
| FR | 828434 A | * | 1/1937 | .......... B60B 1/041 |
| GB | 666584 A | * | 2/1949 | .......... B60B 1/044 |

OTHER PUBLICATIONS

Machine translation of FR 828434 A, 2 pages (Year: 1937).*
Machine translation of DE 102008048453 A1, 13 pages (Year: 2009).*

*Primary Examiner* — S. Joseph Morano
*Assistant Examiner* — Emily G. Castonguay

(57) ABSTRACT

A vehicle wheel having a rim, a hub, a plurality of spokes with at least one of the spokes having a first portion connected the rim and a second portion connected to the hub. The rim includes a spoke bed wall with a radially outboard surface and a spoke hole having a radially outboard entrance and perimeter edge. The spoke extends through the spoke hole and is engaged to the spoke bed wall by an overlie engagement at a bearing interface between a bearing surface of the spoke and the radially outboard surface to limit longitudinally inward displacement between the spoke and spoke bed wall. At least a portion of the bearing interface is laterally outwardly spaced from the first perimeter edge by a lateral distance of at least 0.7 millimeters.

23 Claims, 12 Drawing Sheets

(56) References Cited

U.S. PATENT DOCUMENTS

2003/0090141 A1\* 5/2003 Dietrich ............... B60B 21/062
 301/58
2010/0301662 A1\* 12/2010 Schlanger ............... B60B 1/041
 301/58

\* cited by examiner

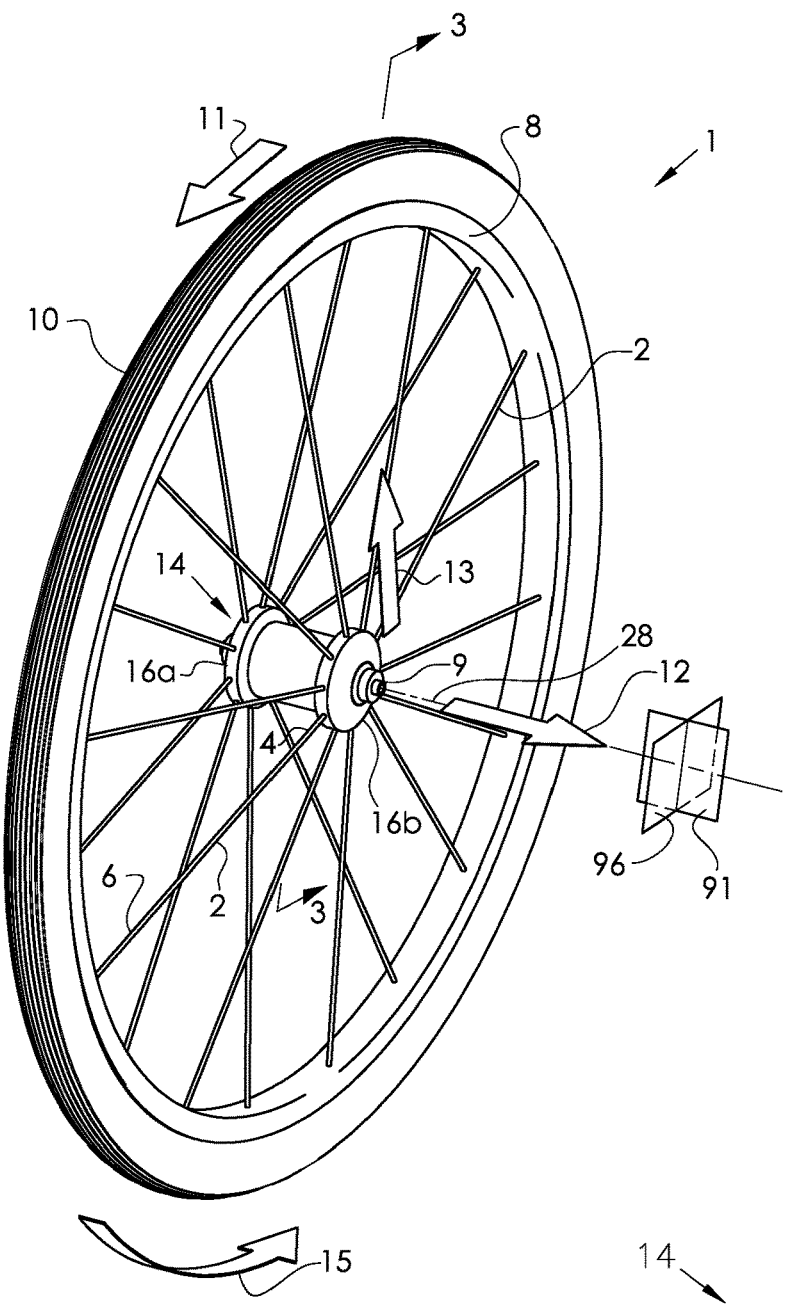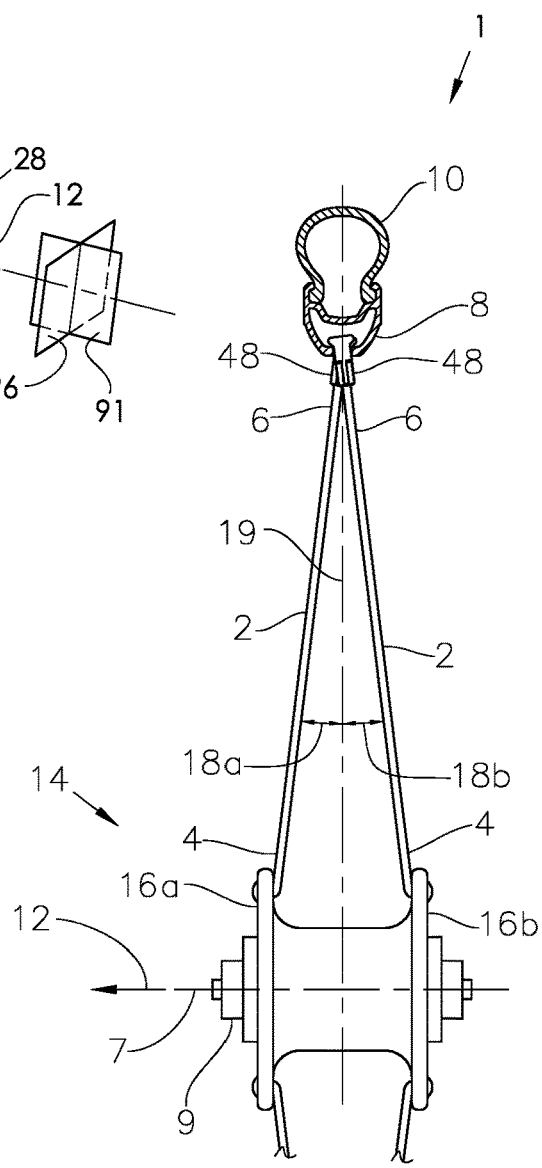
Fig. 1a
Prior Art
Fig. 1b
Prior Art

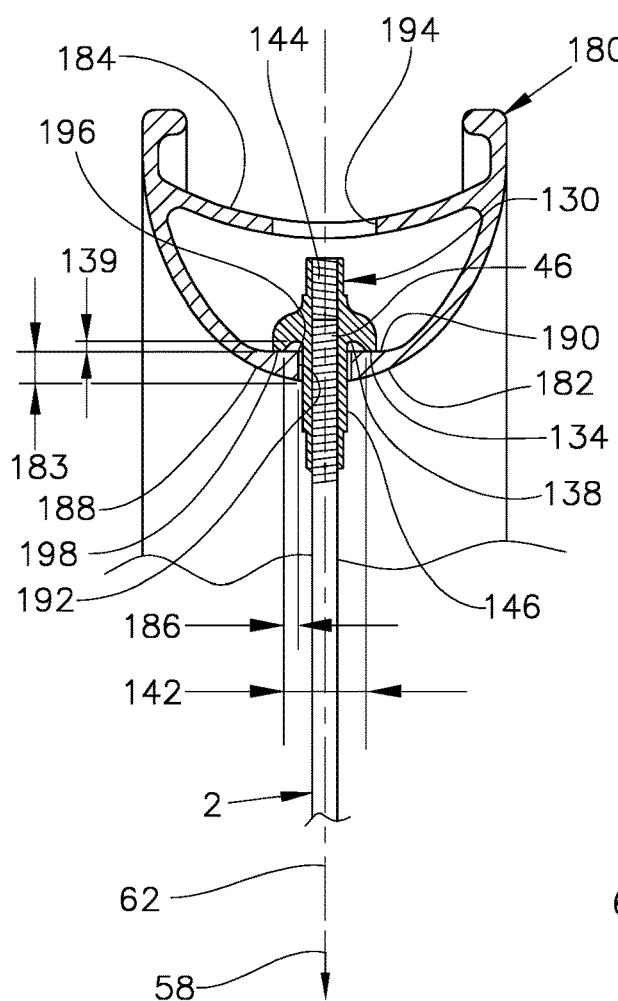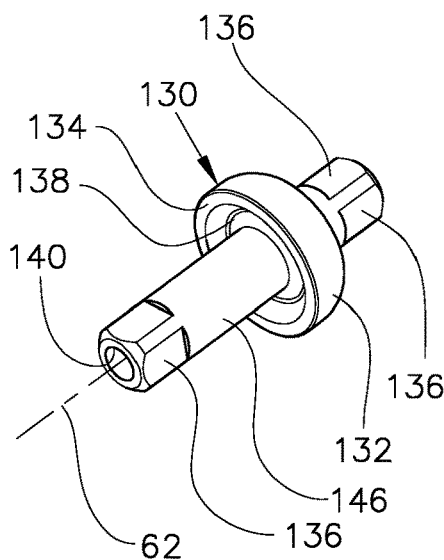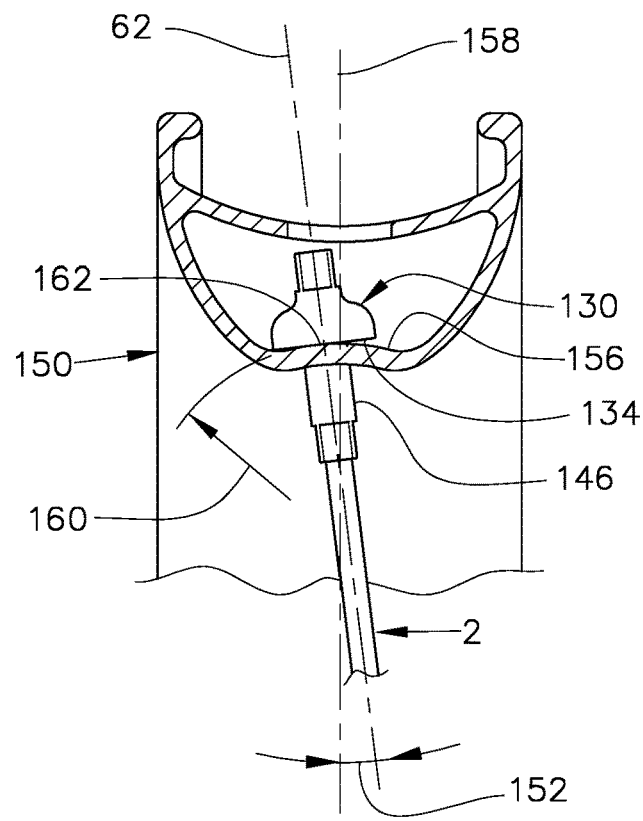

RIM REINFORCEMENT FITTING

CROSS-REFERENCE TO RELATED APPLICATIONS

This application claims priority of Provisional Patent Application Ser. No. 62/884,684, filed Aug. 9, 2019.

BACKGROUND OF THE INVENTION

(1) Field of the Invention

The present invention relates to spoked vehicle wheels and bicycle wheels in particular. More specifically, this invention relates to an insert utilized to provide a high strength connection between a spoke and rim of a vehicle wheel.

(2) Description of the Related Art

In the development of a tension-spoked wheel, the geometry of interaction between the spoke and the rim is of particular importance as it relates to the strength, stiffness, and longevity of the completed wheel structure. The overlie engagement between the under-head surface of the nipple and the spoke bed of the rim serves to provide the requisite bracing to resist the spoke tension forces of the wheel.

Firstly, it is shown that, due to bracing angle and incline angle of the spoke, the under-head surface of a conventional spoke nipple contacts the spoke bed at only a single contact point. Such a small contact area, combined with the high spoke tension of modern wheels, creates very high contact stress at this singular contact point. The result is excessive galling between the spoke nipple and the rim as the nipple is rotatably adjusted to bring the spoke up to the desired tension. This provides resistance to rotation of the nipple and thereby makes the nipple more difficult to adjust. In addition, this also causes the nipple and rim to abrade against each other, removing nipple and/or rim material and potentially weakening the structural integrity of one or both of these components.

Further, it is well understood that the spoke hole of the rim constitutes a structural stress riser in the rim. Accordingly, it may be viewed that the spoke hole effectively causes a localized weakness to the rim. With conventional spoke nipples, the bearing interface between the nipple and the rim occurs directly at the edge of the spoke hole, commonly the weakest point of the rim's spoke bed. It is also understood that, in use, the wheel is subject to both static loads (due to spoke pre-tension) and cyclic loads (due to rolling of the wheel under load). The combination of rim weakness and high contact stresses at this interface results in cracks in the spoke bed due to fatigue loading. These cracks commonly radiate outwardly from the spoke hole. This requires that rims to be heavily reinforced and thickened in the spoke bed region of the rim, which undesirably adds weight to the rim and to the assembled wheel. Since rims are commonly produced in an extrusion process, selective thickening is not feasible and this thickened spoke bed extends around the full circumference of the rim, not just in the regions surrounding the spoke holes. As such, this further increases additional weight of prior-art rims.

Secondly, this single contact point is offset from the centerline of the spoke. Since the spoke tension acts along the spoke centerline, and the resisting force acts at this contact point, this offset results in a bending moment at the spoke nipple. Since the spoke tension increases and decreases cyclically as the wheel is rotated, this bending moment introduces a bending stress to the spoke, which reduces the fatigue life of the spoke nipple and/or rim. In fact, it is not at all uncommon for a spoke to fail due to fatigue under normal use.

Further, this bending moment tends to deflect the spoke and add a bent region in the spoke adjacent the nipple. The bent region will tend to flex somewhat due to the variations in spoke tension experienced during normal use of the wheel. This flex has the effect of reducing the effective tensile stiffness of the spoke and thus tends to reduce the lateral stiffness of the wheel. The result is a more "wobbly" and less responsive feel on the part of the rider. This bending also serves to increase fatigue stresses and exacerbate spoke failure due to fatigue.

SUMMARY OF THE INVENTION

The present invention includes a spoke nipple and/or nipple insert that has a radially inwardly facing engagement surface that is variable in a radial direction and/or in a direction parallel to central axis of the spoke hole ("spoke hole axis"). More specifically, the engagement surface includes a first region thereof that is laterally adjacent the spoke hole and a second region that is laterally outward from the first region, where the first region is radially outward of the second region. There may be a smooth transition between the first and second regions or there may be a stepped transition between the first and second regions. Further, the engagement surface may be directly in the spoke nipple or the engagement surface may be in an intermediate spoke insert that is positioned between the spoke nipple and the spoke bed of the rim.

In comparison with conventional spoke/rim connections, this variable engagement surface serves to provide: (i) a broadened area of bearing surface, thus reducing the corresponding contact stresses; and/or (ii) a bearing surface that is laterally outwardly spaced away from the from the spoke hole of the rim, thus reducing the contact stress at the edge of the of the spoke hole of the rim.

In accordance with the present invention, it has now been found that the forgoing objects and advantages may be readily obtained.

Since the contact stress is reduced, the fatigue life of the rim and/or nipple is increased. Accordingly, the thickness of the spoke bed of the rim may be correspondingly reduced, which serves to reduce the weight of the rim.

Additionally, since it is commonly understood that the spoke hole is a stress riser of the spoke bed, moving the region of the contact stress laterally outward and away from the perimeter edge of the spoke hole serves reduce this stress-riser effect and to increase the fatigue life of the rim and/or nipple. Accordingly, the thickness of the spoke bed of the rim may be correspondingly reduced, which serves to reduce the weight of the rim.

The present invention has several advantages over existing wheel designs, including: an increase in the fatigue life of the wheel; a reduction in the weight of the wheel; an increase in the lateral stiffness of the wheel; reduction or elimination of the galling and abrasion between the spoke and the nipple; the ability to produce the wheel economically at low cost; and an increase in strength of the rim.

The novel features which are believed to be characteristic of the invention, both as to organization and method of operation, together with further objects and advantages thereof, will be better understood from the following description of the accompanying drawings of the embodiments of the present invention. It is expressly understood, however, that the drawings are for the purpose of illustration and description only and are not intended as a definition of the limits of the invention.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 1a is a perspective view schematically illustrating the general configuration of a vehicle wheel as applied to a bicycle wheel.

FIG. 1b is an axial plane cross-sectional view of the wheel of FIG. 1a along 3-3.

FIG. 2d is an axial plane cross-section detail view of the wheel of FIG. 2a.

FIGS. 3a-b are partial perspective views, describing the sequential assembly steps involved in assembling a spoke to a rim.

FIG. 3a is a partial perspective exploded detail view of a first embodiment of the present invention, with the rim shown in axial plane cross-section, including a spoke and nipple aligned for assembly to the rim.

FIG. 3b is a partial perspective detail view, showing the embodiment of FIG. 3a, with the rim shown in axial plane cross-section and with the spoke and an "internal" spoke nipple next assembled through a spoke hole of the rim.

FIG. 3c is a perspective view of the spoke nipple of FIG. 3a.

FIG. 3d is an axial plane cross-section exploded detail view, taken along 110-110, of the embodiment of FIG. 3a and corresponding to the assembly sequence of FIG. 3a.

FIG. 3f is a cross-section detail view, of a second embodiment of the present invention, with the rim shown in axial plane cross-section and with the spoke and an "external" spoke nipple assembled through a spoke hole of the rim.

FIG. 3g is a perspective view of the spoke nipple of FIG. 3f.

FIG. 3h is a cross-section detail view, of a third embodiment of the present invention, with the rim shown in axial plane cross-section and with the spoke and an "external" spoke nipple assembled through a spoke hole of the rim. The rim is shown with a convex spoke bed and the spoke is shown with bracing angle.

FIG. 4a is a partial perspective exploded detail view of a fourth embodiment of the present invention, with the rim shown in axial plane cross-section, including a spoke, a spoke nipple, and a washer aligned for assembly with the rim.

FIG. 4b is a partial perspective detail view, showing the embodiment of FIG. 4a, with the rim shown in axial plane cross-section and with the spoke nipple, washer, and spoke next assembled within a spoke hole of the rim.

FIG. 4c is an axial plane cross-section exploded detail view, taken along 112-112, of the embodiment of FIG. 4a and corresponding to the assembly sequence of FIG. 4a.

FIG. 5e is a partial perspective exploded detail view of a sixth embodiment of the present invention, with the rim shown in axial plane cross-section and including a spoke, a nipple, and a reinforcement washer with two bearing pads.

FIG. 5f is a partial perspective detail view, showing the embodiment of FIG. 5e, with the rim shown in axial plane cross-section and with the spoke nipple, washer, and spoke next assembled within a spoke hole of the rim.

DETAILED DESCRIPTION OF THE INVENTION

Figure 2A:
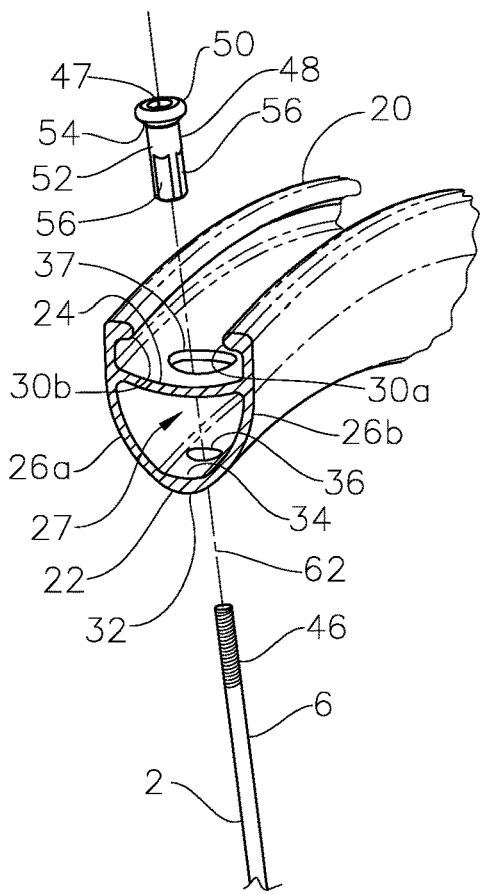
FIG. 2a is a partial perspective exploded view of a wheel of prior art design, with the rim shown in axial plane cross-section.

FIG. 1 describes the basic configuration of an exemplary prior art vehicle wheel, in particular, a bicycle wheel 1, as well as a description of the direction conventions used throughout this disclosure. For clarity, the bicycle frame and the quick release skewer assembly are not shown in this figure. The hub shell 14 is rotatable about the axle 9 and includes at least two axially spaced hub flanges 16a and 16b, each of which include a means for connecting with a multiplicity of spokes 2 connected thereto. Axle 9 includes end faces 11a and 11b that define the spacing of its mounting with the frame (not shown). The axial axis 28 is the axial centerline of rotation of the bicycle wheel 1. The hub flanges 16a and 16b may be contiguous with the hub shell 14 or may be separately formed and assembled to the hub body 12 portion of the hub shell 14. Each spoke 2 is affixed to its respective hub flange 16a or 16b at its first end 4 and extend to attach the rim 8 at its second ends 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An orientation that is radially inboard (or inward) is nearer to the axial axis 28 of rotation and a radially outboard (or outward) is further from the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard orientation is an orientation that is radially proximal to the axial axis 28 and a radially outboard orientation is an orientation that is radially distal to the axial axis 28. An axially inwardly facing surface is a surface that faces toward the axial midpoint between the two end faces 11a and 11b. Conversely, an axially outwardly facing surface is a surface that faces away from the axial midpoint between the two end faces 11a and 11b. While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

It may be easiest to mold or otherwise form or fabricate the individual hub flanges 16 separately and then assemble these hub flanges 16, along with other components as required, such as the body portion 12, to create a complete hub shell 14. This hub shell 14 assembly may be permanent or else it may be removably assembled, allowing the hub flange 16 to be disassembled from the other portions of the hub shell 14 for servicing in the field. However, it is also anticipated that the hub shell 14, including the body portion 12 and a multiple of hub flanges 16, may be molded or formed together as a unit.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be adapted or otherwise applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim. Additionally, a tension-spoke wheel will usually be pre-tensioned during assembly to create a pre-tensioned structure of balanced spoke tension that allows the axle supporting loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral or side-to-side loads, only a single hub flange may be employed.

The spoke 2 is a generally long slender tensile element with a longitudinal axis 62 along its length and generally parallel to its sidewalls. The spoke 2 also has a tensile axis 61 of applied tensile load 58 that extends along the span portion of the spoke 2 between its anchor points at the rim 8 and hub flange 16. The tensile axis 61 is generally collinear to the longitudinal axis 62, except where the spoke 2 is bent to deviate from the tensile axis 61. For the purposes of definition, as relating to spokes 2 and connections thereto, the term "longitudinal" herein refers to alignment along the longitudinal axis 62. A longitudinally inboard (or inward) orientation refers to an orientation proximal the midpoint of the span portion. Conversely, a longitudinally outboard (or outward) orientation refers to an orientation distal the midpoint of the span portion. The term "lateral" herein refers to an orientation in a direction generally perpendicular to the longitudinal axis 62. A laterally inboard (or inward) orientation refers to an orientation proximal the longitudinal axis. Conversely, a laterally outboard (or outward) orientation refers to an orientation distal the longitudinal axis 62.

FIGS. 2a-f describe an exemplary rim 20 of generally conventional geometry. As detailed in FIGS. 2a and 2b, rim 20 is of a generally hollow construction, commonly termed "double-wall" construction, and includes a radially inboard spoke bed 22 wall of thickness 23 and a radially outboard tire bed 24 wall and generally radially extending sidewalls 26a and 26b to define a generally hollow circumferential cavity 27. Spoke bed 22 is defined by a radially inboard surface 32 and a radially outboard surface 34. Hooked flanges 30a and 30b are adapted to engage the beads of a conventional tire (not shown).

The spoke bed 22 is pierced with a plurality of spoke holes 36 adapted for connection with their respective spokes 2 via spoke nipples 48. It may be seen that the spoke hole 36 has a radially inboard edge 38 at its intersection with the inboard surface 32 and a radially outboard edge 40 at its intersection with the radially outboard surface 34. Further, outboard edge 40 may be seen to have axially spaced quadrant points 42a and 42b as well as circumferentially spaced quadrant points 44a and 44b. The tire bed 24 is pierced by clearance hole 37 that is aligned with spoke hole 36, to permit the nipple 48 to be assembled as shown in FIGS. 2c and 2d. Note that clearance hole 37 is merely one common means to permit the nipple 48 to be assembled to the rim; a wide range of alternative means may be substituted, including means that do not require a clearance hole.

It is useful to understand that it is common to manufacture the rim 20 by extruding the straight profile shown here and rolling the extrusion into a circumferential hoop with its ends joined by either a welded, sleeved or pinned connection. Spoke holes 36 and clearance holes 37 are then drilled in their proper locations.

Figure 2C:
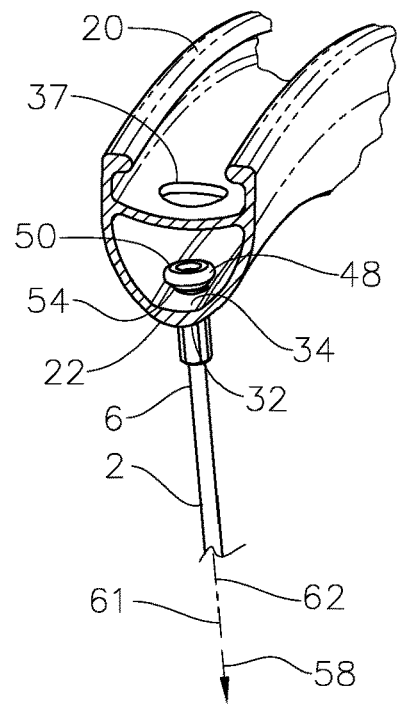
FIG. 2c is a partial perspective view, with the rim in axial plane cross-section, showing the wheel of FIG. 2a with the spoke and nipple assembled to the rim.
Figure 2B:
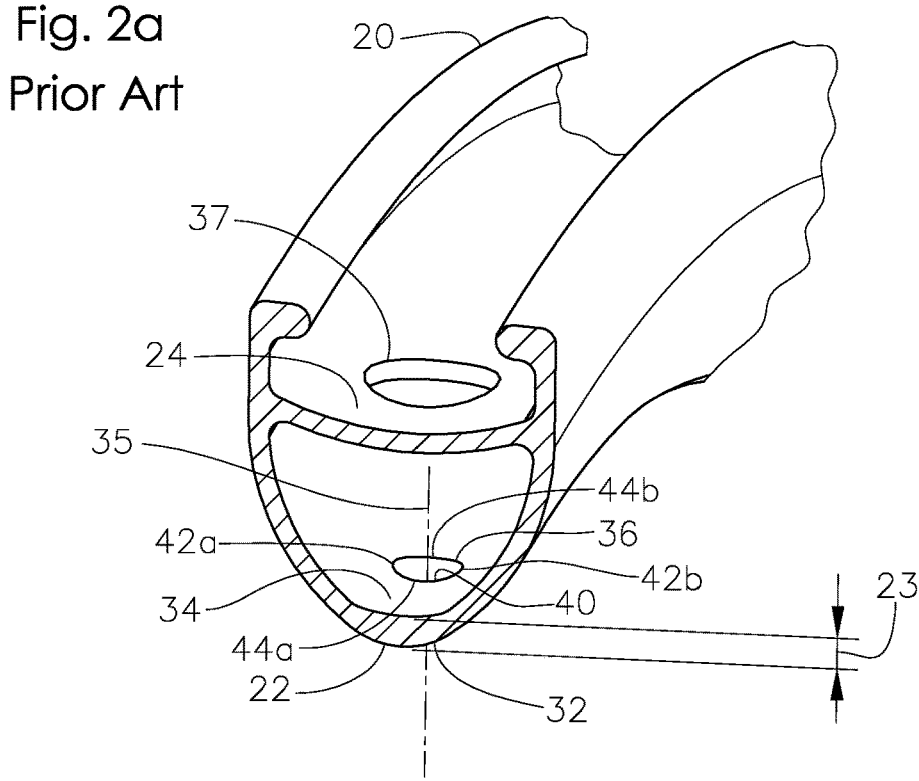
FIG. 2b is an enlarged detail of a portion of the rim of FIG. 2a, with the rim shown in axial plane cross-section.

FIG. 2a shows an exploded view that describes the conventional arrangement by which the second end 6 of the spoke 2 is connected to the rim 20. The second end 6 of spoke 2 includes external threads 46 to mate with internal threads 47 of spoke nipple 48. Spoke nipple 48 includes an enlarged head 50 and a shank 52, with a generally conical tapered transition portion 54 extending between the underside of the head 50 and the shank 52. Spoke nipple 48 also includes flats 56 for engagement with a mating wrench (not shown) for manual manipulation to adjust the spoke pretension by adjusting the threaded engagement between external threads 46 and internal threads 47. Nipple 48 is considered an "external" spoke nipple, since it has a shank 52 that extends through the spoke hole 36 so that its flats are exposed and may be manipulated external to the rim 20. FIGS. 2c-f shows the spoke nipple 48 threadably assembled to the spoke 2 such that the transition portion 54 overlies and contacts the outboard edge 40. The spoke nipple 48 is thereby braced against the spoke bed 22 to resist the spoke tension 58 of the spoke 2.

Figure 2F:
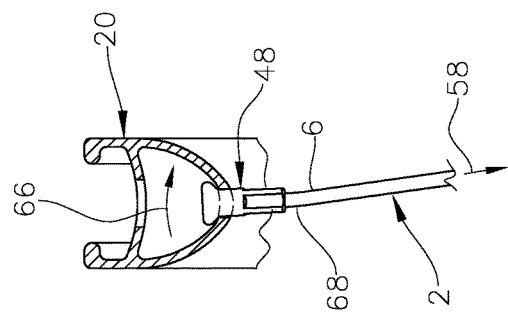
FIG. 2f is a an axial plane cross-section detail view of the wheel of FIG. 2a, showing a bent region of the spoke.
Figure 2E:
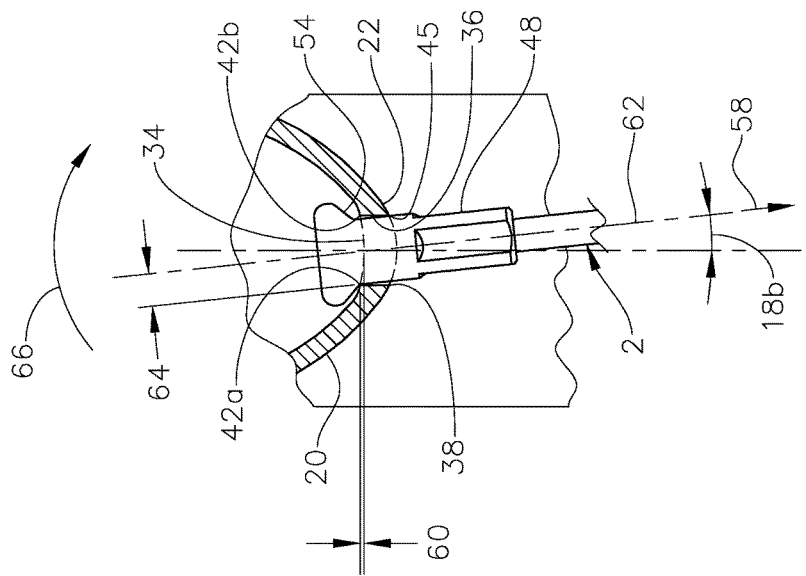
FIG. 2e is a cross-section detail view along 57 of FIG. 2d.
Figure 2D:
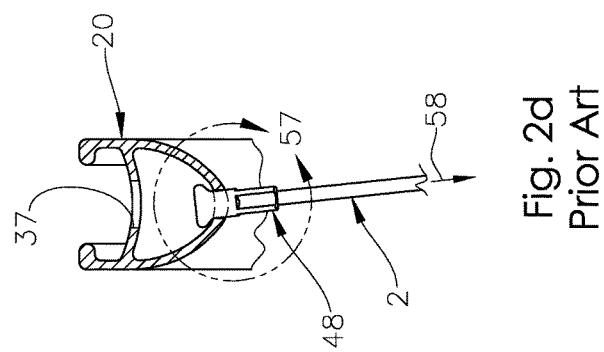

It may be seen that the outboard surface 34 of the spoke bed 22 is of slightly concave geometry as viewed in the cross sectional views of FIGS. 2d-f. Thus the intersection between the cylindrical spoke hole 36 and the concave outboard surface 34 creates a saddle-shaped outboard edge 40, such that quadrant points 42a and 42b are spaced by radial distance 60 to be radially outboard of quadrant points 44a and 44b. With spoke nipple 48 aligned with angle of inclination 18b as shown, it may be seen that the transition portion 54 contacts the outboard surface 34 of the spoke bed 22 only at the quadrant point 42a, which is offset from the spoke centerline (i.e. longitudinal axis 62) by distance 64. Shank 52 also contacts inboard edge 38, which restrains axial movement of the nipple 48 and forces the transition portion 54 against quadrant point 42a. With the transition portion 54 supported only by quadrant portion 42a, it may be seen that the transition portion 54 does not contact, and is spaced from, the outboard edge 40 at quadrant points 42b, 44a and 44b.

Since the spoke tension 58 acts along the spoke centerline 62, the offset distance 64 (between the spoke centerline 62 and contacting quadrant point 42a) tends to induce a moment to rotate the spoke nipple 48 in the direction 66 toward a reduced angle of inclination 18b that is no longer in alignment with the longitudinal axis 62. Further, the spoke tension 58 tends to induce the conical transition portion 54 to ramp against its contact point at quadrant point 42a. This, in combination with the contact between the inboard edge 38 and shank 52 at contact point 45 further induces the nipple 48 to pivot in the direction 66. The result is that the spoke 2 tends to bend in response to the aforementioned moment, thus creating a bent region 68 just inboard of the spoke nipple 48 and thereby inducing a bending stress in the spoke 2 as shown in FIG. 2f. As with all tension-spoke wheels, as the loaded wheel 1 is rotated along the ground, each successive spoke undergoes a cycle of reduced and increased spoke tension 58. This causes the bent region 68 to flex with each revolution of the wheel, creating a much higher potential for fatigue failure of the spoke 2 as compared to a spoke without a bent region 68 and its associated bending stress. Further, the bending and associated flex described here tends to reduce the effective tensile stiffness of the spoke 2 between its attachment points, thereby reducing the overall structural stiffness of the wheel 1.

Further, since the majority of the spoke tension 58 is braced and resisted by the overlie engagement between the nipple 48 and only the single contact point at quadrant point 42a, the contact load due to spoke tension 58 induces a very highly concentrated contact stress at this singular contact point. This high contact stress may result in localized galling as the nipple 48 is rotatably manipulated with in its spoke hole 36. Further, this high contact stress may cause excessive stress and deformation of the nipple 48 and/or spoke hole 36.

This very high localized stress also commonly causes cracking and failure of the rim due to fatigue. To resist the stress and minimize such failure, the spoke bed 22 needs to be very thick (thickness 23), which adds weight to the rim, detracting from the performance of the wheel.

It is noted that the concentrated single contact point at quadrant point 42a is also coincident with the edge of the spoke hole 36. Thus, not only does the existence of spoke hole 36 create a stress riser in the spoke bed 22, but the region of highest contact stress occurs right on the edge of this spoke hole. As a result, due to high usage and fatigue loading, it is very common for cracks to form in the spoke bed 22 that radiate out from the spoke hole.

One method to mitigate these fatigue cracks is to modify the conventional design to distribute the spoke contact loads over a larger area of the rim to reduce the contact stress. Another method is to modify the conventional design to place the spoke contact stress at a location laterally outboard of the edge 40. It is preferable to employ both of these methods to mitigate fatigue cracks.

The embodiment of FIGS. 3a-e describes an arrangement whereby the spoke nipple 100 is designed such that contact loads due to spoke tension 58 are positioned at a location that is laterally outboard of the spoke hole 82 and away from the outboard edge 86.

Spoke nipple 100 (also termed herein as "nipple") as shown in FIGS. 3a-e is considered an "internal" spoke nipple since it does not include a shank portion that extends through the spoke hole 82. Such internal spoke nipples may be preferable to external spoke nipples because they require a smaller spoke hole in the rim and because they result in a cleaner aesthetic appearance. As shown in FIGS. 3a-e, spoke nipple 100 includes an enlarged portion 102 adjacent its longitudinally inboard end with a longitudinally inward facing bearing face 104 and flats 106 for manual manipulation with a wrench in the conventional manner. Bearing face 104 includes a central relieved recess 108 of diameter 118 that is larger than the diameter 83 of spoke hole 82 and has a recess depth 109. Bearing face 104 circumscribes recess 108 about the longitudinal axis 62. Spoke nipple 100 also includes a central hole 116 with internal threads 120 to threadably mate with external threads 46 of spoke 2 in the conventional manner.

Rim 70 is generally identical to rim 20 of FIGS. 2a-f, with the exception that the spoke hole 82 is of smaller diameter to accommodate only the second end 6 of spoke 2, without providing clearance for the shank of an "external" spoke nipple. Rim 70 includes a radially inboard spoke bed 72 wall of thickness 73, a radially outboard tire bed 74 wall, and generally radially extending sidewalls 76a and 76b to define a generally hollow circumferential cavity 77. Spoke bed 72 is defined by a radially inboard surface 78 and a radially outboard surface 80. Spoke 2 is schematically identical to spoke 2 described in FIGS. 2a-f.

Figures 3A, 3B, 3C:
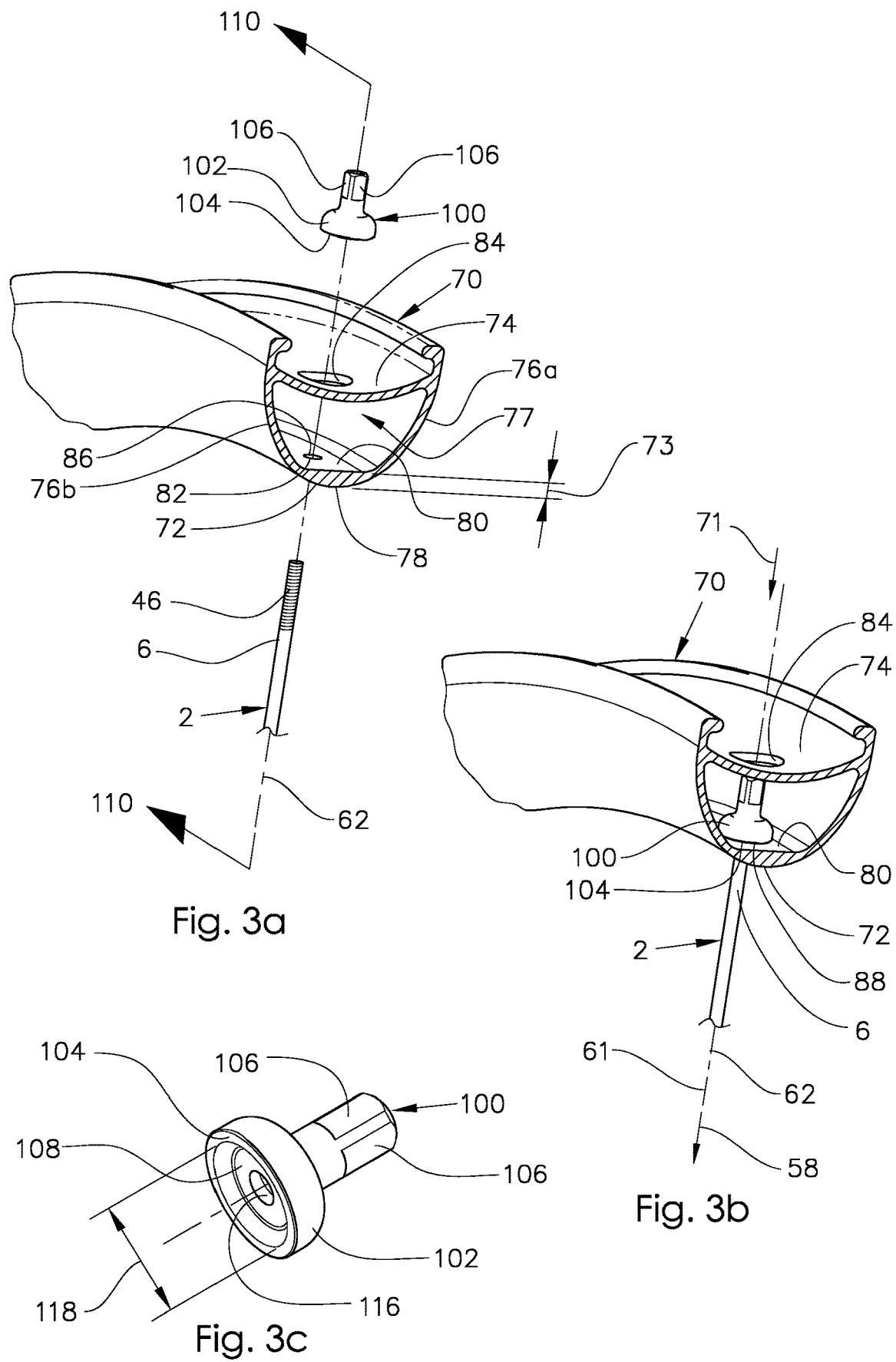
Figure 3D:
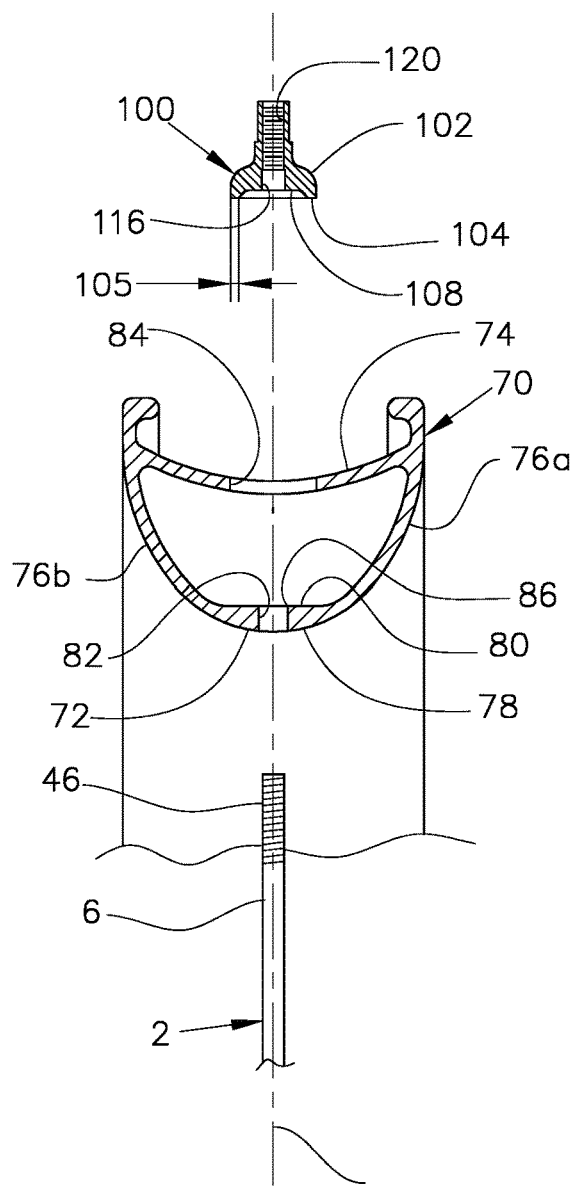
Figure 3E:
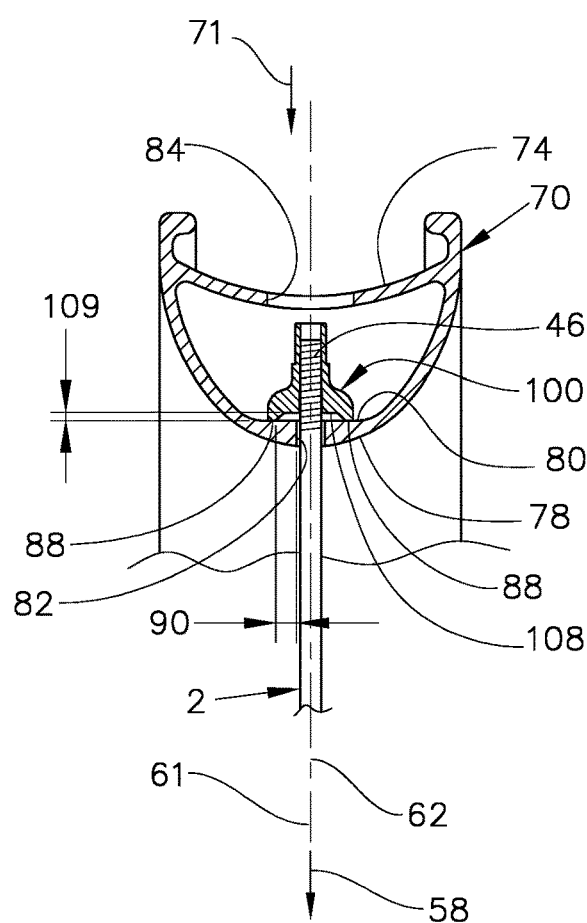
FIG. 3e is an axial plane cross-section detail view, taken along 110-110, of the embodiment of FIG. 3a and corresponding to the assembly sequence of FIG. 3b.

The spoke bed 72 is pierced with a plurality of spoke holes 82 adapted to receive the second end 6 of spoke 2 therethrough in the conventional manner. The spoke 2 is connected to rim 70 via spoke nipples 100 in the conventional manner. Spoke hole 82 is sized to provide assembly clearance with the second end 6 of the spoke 2. It is often preferable that this assembly clearance provide piloting of the second end 6 within the spoke hole 82 so that the lateral position therebetween is controlled. The spoke hole 82 has a radially outboard edge 86 at its entrance and intersection with the radially outboard surface 80. The tire bed 74 is pierced by access hole 84 that is aligned with spoke hole 82 to permit the nipple 200 to be assembled in direction 71 as shown in FIGS. 3b and 3e. Note that access hole 84 is merely one common means to permit the nipple 100 to be assembled to the rim; a wide range of alternative means may be substituted, including means that do not require an access hole 84.

As shown in FIGS. 3b and 3e, the spoke 2 and nipple 100 are assembled to the rim 70 in the conventional manner, with internal threads 120 threadably assembled to external threads 46 of the spoke 2. Tightening this threadable assembly induces spoke pre-tension in the wheel in the conventional manner. The bearing face 104 contacts and abuts the outboard surface 80 at a bearing interface 88. The term "bearing face" or "bearing surface" herein describes the portion of the spoke, nipple, or washer that contacts the outboard surface 80 in an overlie engagement to limit longitudinally inward displacement of the spoke 2 relative to the spoke bed 72 and to support spoke tension 58. The term "bearing interface" describes the contacting interface where two surfaces abut to bear and press against each other. As shown in FIGS. 3b and 3e, the spoke tension 58 causes bearing face 204 to press and bear against the outboard surface 80 of the spoke bed 72 at bearing interface 88, resulting in contact stress on outboard surface 80. Since the diameter 118 of concave recess 108 is significantly larger than the diameter of spoke hole 82, this contact stress occurs at a location on the outboard surface 80 that is laterally outboard of the outboard edge 86 of spoke hole 82. The recess 108 laterally surrounds and circumscribes the spoke hole 82 (about the longitudinal axis 62) and allows spoke nipple 100 to bridge laterally, over and across the spoke hole 82, without contacting its outboard edge 86. This is in contrast to the prior art arrangement described in FIGS. 2a-f where the contact stress occurs directly at the outboard edge 40. It is preferable that the diameter 118 of recess 108 be at least 1.4 millimeters, and more preferably at least 2.0 millimeters, larger than the diameter of spoke hole 82. It is also preferable that the corresponding bearing interface 88 between the bearing face 104 and the outboard surface 80 be laterally outboard of the outboard edge 86 by a lateral gap (i.e. distance 90) of at least 0.70 millimeters. It is more preferable that this bearing interface 88 be laterally outboard of the outboard edge 86 by a distance 90 of at least 1.00 millimeters and still more preferable that the distance 90 be at least 1.3 millimeters. As dimension 90 is increased, the effect of the stress concentration in the spoke bed 72 due to the spoke hole 82 is decreased and the strength and fatigue endurance of the bearing interface 88 is increased. It is also preferable that the bearing interface 88 be laterally outboard of the outboard edge 86 around its full perimeter by at least 0.7 mm. Bearing face 104 has a lateral width 105. As shown in FIG. 3e, bearing surface 104 has an overlie engagement with outboard surface 80 to limit longitudinal displacement of the spoke 2 relative to the spoke bed 72 and to support spoke tension 58.

It is preferred that the recess depth 109 be large enough to insure that the bearing interface 88 be clearly defined as being laterally outboard of outboard edge 86 as described hereinabove. It is also preferable that the recess depth 109 be small enough so that the nipple 100 may be produced with a minimum amount of material to minimize its weight. As such it is preferable that the recess depth 109 be at least 0.30 millimeters. It is also preferable that the recess depth be less than 1.0 millimeters.

Due to the longitudinal step (i.e. recess depth 109) at the transition between bearing face 104 and recess 108, it is understood that FIGS. 3a-e describe an embodiment where the underside face is radially and longitudinally variable over a lateral distance to create a longitudinally outward recess 108 that is laterally inward and laterally adjacent the spoke hole 82 and a longitudinally inward bearing face 104 that is laterally outward and laterally distal the spoke hole 82.

Since it is understood in engineering principles that the spoke hole 82 creates a stress riser or stress concentrator in the spoke bed 72 of the rim 70, effectively creating a weakened region. It is preferable to position any contact stresses as far laterally outwardly from the outboard edge 86 as reasonably possible, since this will reduce the stress in this weakened region. The offset distance 90 is in contrast the prior-art arrangement of FIGS. 2a-f, which shows the contact stress occurring directly coincident with the outboard edge 40. Since any crack or failure will generally initiate at an edge or other stress riser, applying contact stress at the outboard edge 40 of the spoke hole 36 (as shown in FIGS. 2a-f) will more readily initiate a failure crack at this edge 40 than applying a similar stress at a location that is laterally spaced to be distal from the edge 86 (as shown in FIGS. 3a-e). As such, the embodiment of FIGS. 3a-e has reduced propensity for cracking and failure of the spoke bed 72 than the prior art arrangement of FIGS. 2a-f. This means that that the thickness 73 may be reduced in comparison with the thickness 23 of FIGS. 2a-f, thus favorably reducing the weight of the rim 70 in comparison with rim 20. Further, the surface-to-surface contact at bearing interface 88 also has the added benefit of providing a greater contact area than the aforementioned surface-to-edge contact described in FIGS. 2a-f.

Nipple 100 may be considered to be an intermediate element between the spoke 2 and the rim 70 such that the spoke 2 is engaged to the nipple 100 by threadable engagement between internal threads 120 and external threads 46, and the nipple 100 is engaged to the rim 70 by the overlie engagement at bearing interface 88. It is understood that the nipple 100 and spoke 2 may alternatively be schematically combined into a single monolithic and integral element. For example, the spoke may be headed to include bearing face 104. Further, it may be considered that the recess 108 and bearing face 104 may be considered as a laterally outwardly projecting flange of the spoke 2 to provide an overlie engagement with the outboard surface 80 to limit longitudinal displacement therebetween and to support spoke tension 58.

The embodiment of FIGS. 3f and 3g is generally identical to the embodiment of FIGS. 3a-e, with the exception that an "external" nipple 130 is employed in place of "internal" nipple 100. Spoke nipple 130 (also termed herein as "nipple") is considered an "external" spoke nipple since it includes a shank 146 portion that extends through the spoke hole 192. As shown in FIGS. 3*f-g*, spoke nipple 130 includes flats 136 for manual manipulation with a wrench in the conventional manner and an enlarged portion 132 with a bearing face 134. Enlarged portion 132 includes a central relieved recess 138 of diameter 142 that is larger than the diameter of spoke hole 192, and a recess depth 139. Spoke nipple 130 also includes a shank 146 projecting longitudinally inwardly from recess 138, and a central hole 140 with internal threads 144 to threadably mate with external threads 46 of spoke 2 in the conventional manner.

Rim 180 is generally identical to rim 70 of FIGS. 3*a-e*, with the exception that the spoke hole 192 is of larger diameter to accommodate the shank 146 of nipple 130. Rim 180 includes a radially inboard spoke bed 182 wall of thickness 183 and a radially outboard tire bed 184 wall that includes access hole 194 therethrough. Spoke bed 182 is defined by a radially inboard surface 188 and a radially outboard surface 190. Spoke 2 is identical to spoke 2 described in FIGS. 2*a-f*.

The spoke bed 182 is pierced with a plurality of spoke holes 192 adapted to receive shank(s) 146 of mating nipples 130 in the conventional manner. Spoke hole 192 is sized to provide assembly clearance with the shank 146 of nipple 130. It is often preferable that this assembly clearance provide piloting of the shank 146 within the spoke hole 192 so that the lateral position therebetween is controlled.

The spoke hole 192 has a radially outboard edge 196 at its intersection with the radially outboard surface 190. The tire bed 184 is pierced by access hole 194 that is aligned with spoke hole 192, to permit the nipple 130 to be assembled as shown in FIG. 3*f*. Note that access hole 194 is merely one common means to permit the nipple 130 to be assembled to the rim; a wide range of alternative means may be substituted, including means that do not require a clearance hole.

As shown in FIG. 3*f*, the spoke 2 and nipple 130 are assembled to the rim 180 in the conventional manner, with internal threads 144 threadably assembled to external threads 46. Tightening this threadable assembly induces spoke pre-tension in the wheel in the conventional manner. The bearing face 134 contacts and abuts the outboard surface 190 at a bearing interface 198. It preferable that the entirety of bearing interface 198 is positioned to be laterally outwardly spaced from outboard edge 196. The spoke tension 58 causes bearing face 134 to press and bear against the outboard surface 190 of the spoke bed 182, resulting in a corresponding contact stress on outboard surface 190. Since the diameter 142 is significantly larger than the diameter of spoke hole 192, this contact occurs at a bearing interface 198 located laterally outboard of, and spaced from, the outboard edge 196 of spoke hole 192 by distance 186. The recess 138 allows spoke nipple 130 to bridge laterally, over and across the spoke hole 192, without contacting its outboard edge 196. This is in contrast to the prior art arrangement described in FIGS. 2*a-f* where the contact stress occurs directly at the outboard edge 40. The advantages and preferred depth 139 specifications associated with bearing interface 198 of the embodiment of FIGS. 3*f-g* are similar to those described in the embodiment of FIGS. 3*a-e*.

It is noted that FIGS. 3*b*, 3*e*, and 3*f* are schematic views that show the spoke 2 as extending vertically along a radially extending longitudinal axis 62. These figures are intended to schematically describe the bearing interfaces 88 and 198 relative to their respective spoke holes 82 and 192. More commonly, the spoke 2 will have a bracing angle 18*a* or 18*b* relative to the radial axis 19 as described in FIG. 1*b*. FIG. 3*h* describes an embodiment similar to that of FIGS. 3*f-g*, however, rim 150 includes a convex outboard surface 156 and spoke 2 has a bracing angle 152 relative to a radial axis 158.

Rim 150 includes a spoke bed 154 with a spoke hole (not shown) and a radially outwardly facing outboard surface 156. Nipple 130 and spoke 2 are identical to those described in FIGS. 3*f-g*. It may be considered that rim 15 is formed in the conventional manner, namely as a rolled hoop of extruded aluminum having the extrusion profile shown in cross section in FIG. 3*h*. The outboard surface 156 has a convex arcuate profile having a radius 160. The convex arcuate profile extends circumferentially.

When nipple 130 is assembled through spoke hole (not shown) in the manner described in FIG. 3*f*, the flat bearing face 134 may have freedom to teeter and rock on the outboard surface 156, allowing the spoke 2 to axially self-align and to accommodate a bracing angle 152 (between longitudinal axis 62 and radial axis 158). Thus, the bearing interface 162 between the bearing face 134 and the outboard face 156 occurs in two circumferentially spaced locations that straddle the spoke hole 192 and the shank 146. Thus it may be seen here that, although bearing face 134 is a generally flat surface that circumscribes the spoke hole 192 about longitudinal axis 62, the resulting bearing interface 162 is an interrupted and discontinuous bearing interface that does not fully circumscribe the longitudinal axis 62. Bearing face 134 is shown to abut, press and bear against outboard surface 156 at bearing interface 162 that is laterally spaced from the spoke hole at circumferentially spaced locations fore and aft of the spoke hole (not shown). Further details of such a convex outboard surface 156, including the corresponding features and benefits are described in U.S. Pat. No. 7,427,112.

The embodiment of FIGS. 4*a-d* is similar to the embodiment of FIGS. 3*a-e*, with the exception that nipple 100 is omitted in favor of a nipple 200 and washer 210. The nipple 200 provides a threaded connection with the spoke 2, while the recess 216 of the washer 210 includes geometry that provides the advantages of recess 108 of FIGS. 3*a-e*. Rim 70 and spoke 2 are both identical to those described in FIGS. 3*a-e*. Spoke nipple 200 (also termed herein as "nipple") is considered an "internal" spoke nipple since it does not include a shank portion that extends through the spoke hole 82. As shown in FIGS. 4*a-d*, spoke nipple 200 includes an enlarged portion 202 at one end with a spherically convex bearing face 204 and flats 206 for manual manipulation with a wrench in the conventional manner. Spoke nipple 200 also includes a central hole 207 with internal threads 208 to threadably mate with external threads 46 of spoke 2 in the conventional manner.

Washer 210 includes a hole 214 therethrough for passage of the second end 6 of the spoke 2, a longitudinally outwardly-facing spherically concave socket 212, and a longitudinally inwardly-facing bearing face 220. Nipple 200 includes a central relieved recess 216 having a recess depth 217 and a diameter 218 that is larger than the diameter 83 of spoke hole 82.

Figure 4A:
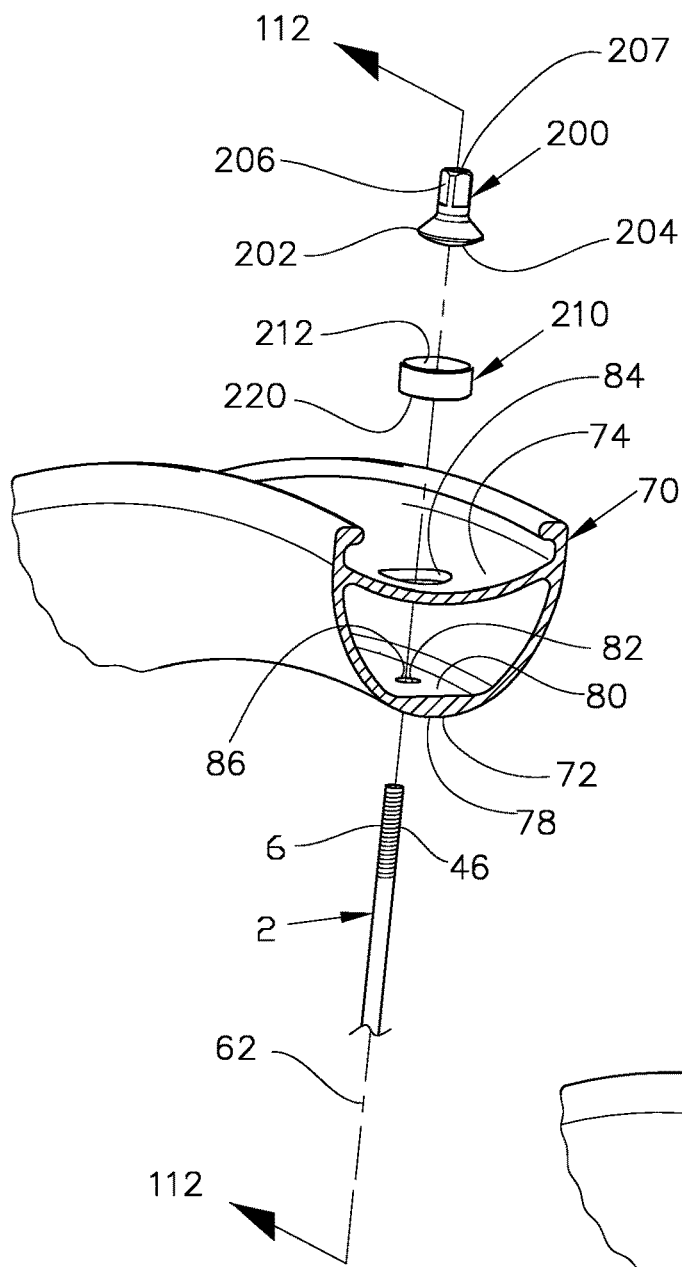
FIGS. 4a-b are partial perspective views, describing the sequential assembly steps involved in assembling a spoke to a rim.
Figure 4B:
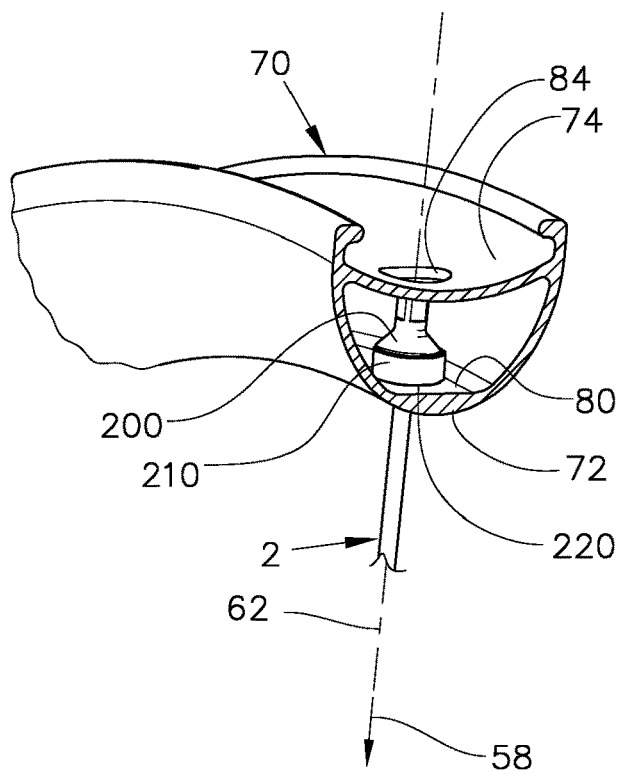
Figure 4C:
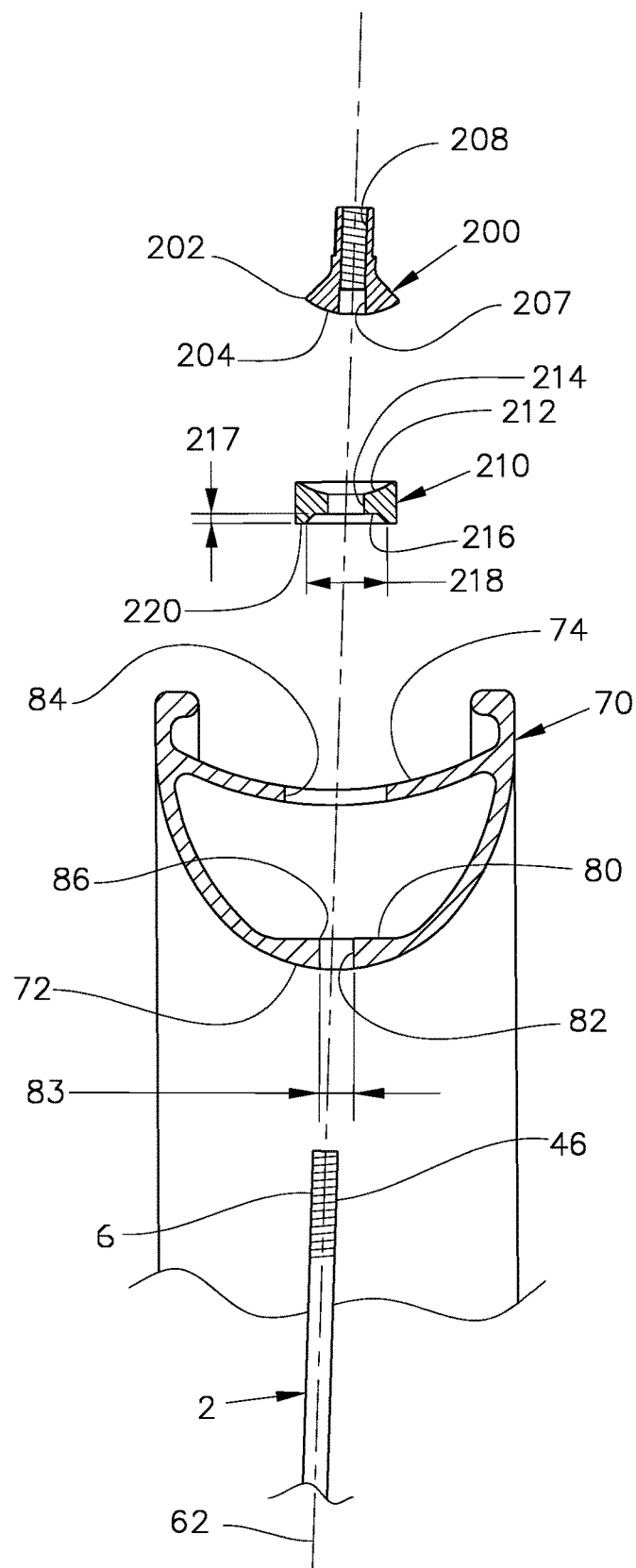
Figure 4D:
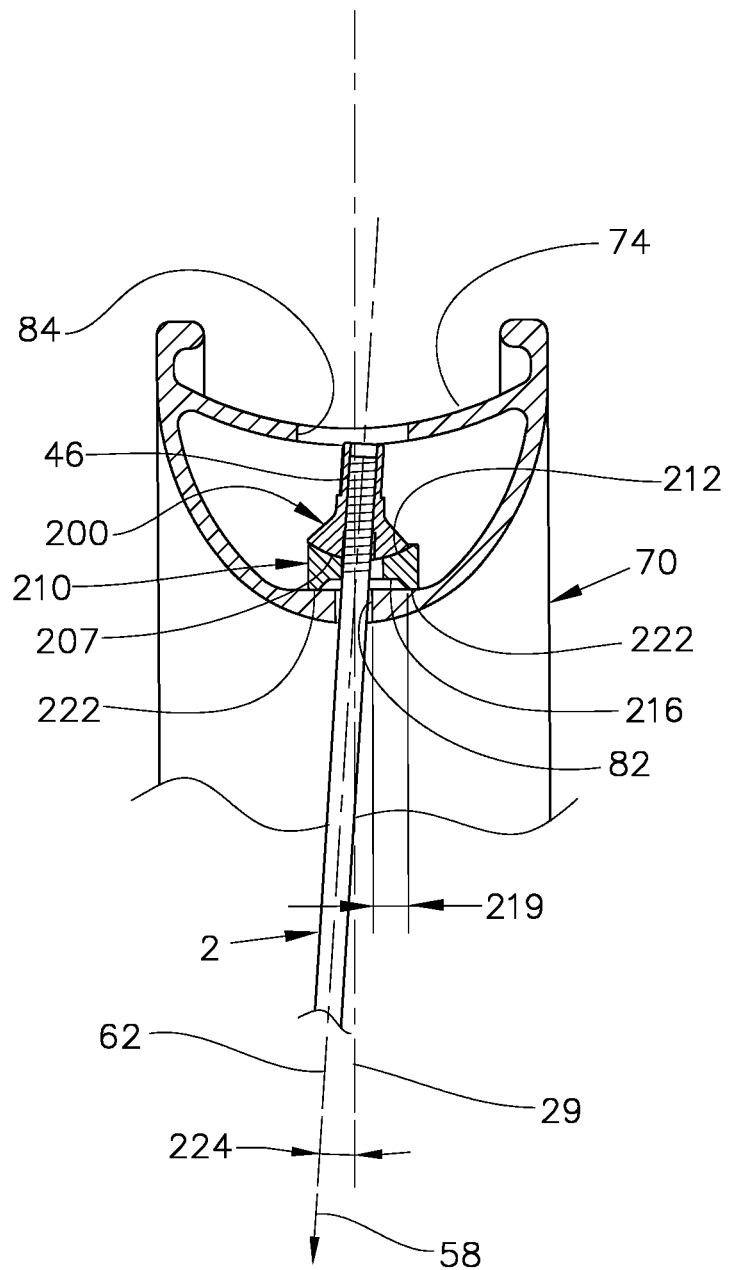
FIG. 4d is a cross-section detail view, taken along 112-112, of the embodiment of FIG. 4a and corresponding to the assembly sequence of FIG. 4b.

As shown in FIGS. 4*b* and 4*d*, the spoke 2, washer 220, and nipple 200 are assembled to the rim 70 in the conventional manner, with internal threads 208 threadably assembled to external threads 46. Threadably tightening this threadable assembly induces spoke pre-tension in the wheel in the conventional manner. The spherical bearing face 204 is matched and nested with spherical socket 212 in a ball-and-socket swivel interface, allowing the nipple 200 to be beneficially self-aligned with the span of the spoke 2 as shown, and to accommodate a bracing angle 224 between the longitudinal axis 62 and the radial axis 29. The bearing face 220 contacts and abuts the outboard surface 80 at a bearing interface 222. The spoke tension 58 causes bearing face 220 to press and bear against the outboard surface 80 of the spoke bed 72, resulting in a contact stress on the outboard surface 80 at bearing interface 222. Since the diameter 218 of recess 216 is significantly larger than the diameter 83 of spoke hole 86, this contact occurs at a location laterally outboard (by distance 219) of the outboard edge 86 of spoke hole 82. It is preferable that the entirety of bearing interface 222 be positioned to be laterally outwardly spaced from outboard edge 86. The advantages and preferred dimension specifications associated with bearing interface 222 of the embodiment of FIGS. 4*a*-*d* are identical to those described in the embodiment of FIGS. 3*a*-*e*.

It is preferred that the recess depth 217 be large enough to insure that the bearing interface 220 be clearly defined as being laterally outboard of outboard edge 86 as described hereinabove and so that the bearing interface be laterally outboard of the outboard edge 86. It may also be preferable that the recess depth 217 be small enough so that the washer 210 may be produced with a minimum amount of material to minimize its weight. As such it is preferable that the recess depth 217 be at least 0.30 millimeters. It may also be preferable that the recess depth be less than 1.0 millimeters.

Nipple 200 may be considered to be a first intermediate element between the spoke 2 and the washer 210 in that the spoke 2 is engaged to the nipple 200 by threadable engagement between internal threads 208 and external threads 46 and the nipple 200 is engaged to the washer 210 by the overlie engagement at between bearing face 204 and socket 212. Further, washer 210 may be considered to be a second intermediate element in that the nipple 200 is engaged to the washer 210 by the overlie engagement at between bearing face 204 and socket 212 and washer 210 is engaged to the spoke bed 72 by the overlie engagement between the bearing face 220 and the outboard surface 80 at bearing interface 222. This chain of engagements serves to engage the spoke 2 to the rim 70 to limit the longitudinally inward displacement therebetween and to support spoke tension 58.

The embodiment of FIGS. 5*a*-*d* is similar to the embodiment of FIGS. 4*a*-*d*, with the exception that washer 210 is omitted in favor of washer 230. Rim 70, nipple 200, and spoke 2 are identical to the respective elements described in FIGS. 3*a*-*e*. Washer 230 includes a hole 234 therethrough for passage of the second end 6 of the spoke 2, a longitudinally outwardly-facing spherically concave socket 232, and a longitudinally inwardly-facing bearing face 235. Bearing face 235 is circumferentially arcuate and has a cylindrical radius 233 of curvature that is equal to or less than the circumferential radius 238 of convex curvature of the outboard surface 80 of spoke bed 72. The radius 233 is concave to form a radial recess of recess depth 237.

Figure 5A:
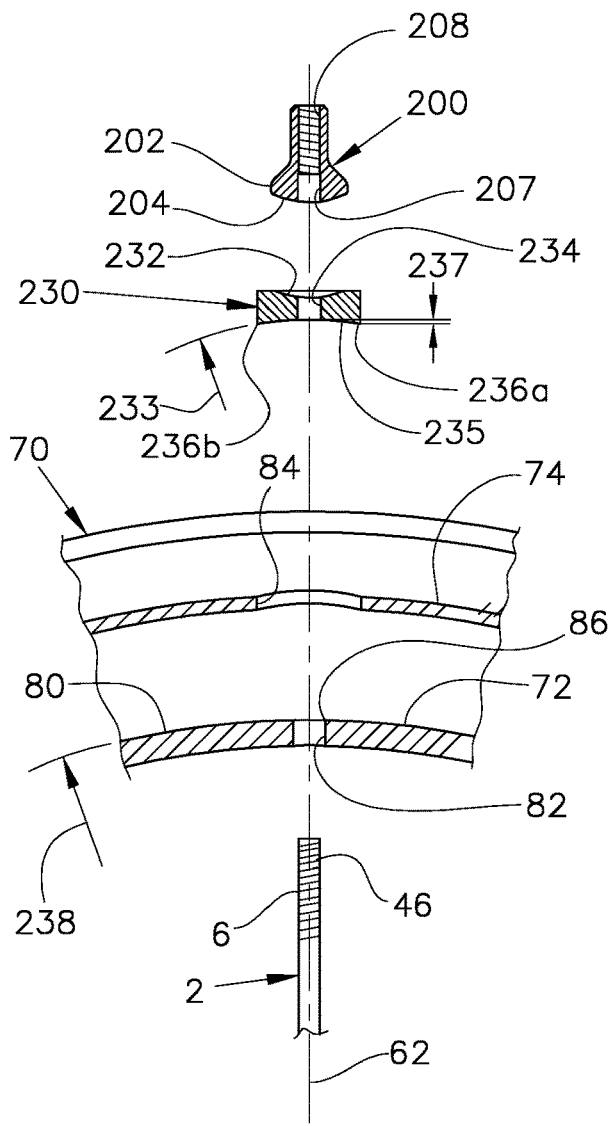
FIG. 5a is a partial radial plane cross section exploded detail view of a fifth embodiment of the present invention, including a spoke reinforcement washer with a circumferentially arcuate bearing surface.
Figure 5B:
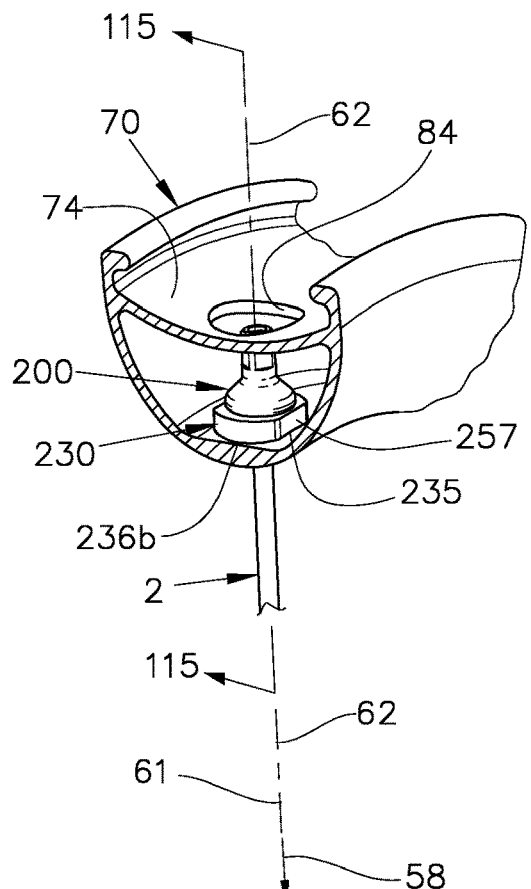
FIG. 5b is a partial perspective detail view, showing the embodiment of FIG. 5a, with the rim shown in axial plane cross-section and with the spoke nipple, washer, and spoke next assembled within a spoke hole of the rim.
Figure 5C:
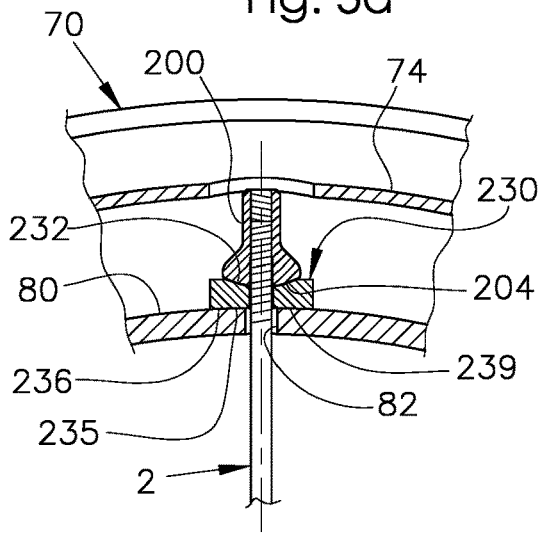
FIG. 5c is a partial radial plane cross section exploded detail view of the embodiment of FIG. 5a, with the spoke nipple, washer, and spoke next assembled within a spoke hole of the rim, and showing the circumferential radius of the bearing face matched to the circumferential radius of the outboard surface of the spoke bed.

As shown in FIG. 5*b*, the spoke 2, washer 230, and nipple 200 are assembled to the rim 70 in the conventional manner, with internal threads 208 threadably assembled to external threads 46. Tightening this threadable assembly induces spoke pre-tension in the wheel in the conventional manner. The spherical bearing face 204 is matched and nested with spherical socket 232 in a ball-and-socket swivel arrangement, allowing the nipple 200 to be beneficially self-aligned with the span of the spoke 2 as shown. The arcuate bearing face 235 contacts and abuts the outboard surface 80 at a bearing interface 239 such that the radius 233 is nested with radius 238. In the case where circumferential radii 233 and 238 are equal, as shown in FIG. 5*c*, the bearing face 235 and outboard surface 80 are perfectly circumferentially matched and nested such that the contact stress at the bearing interface 236 is distributed over the entire arcuate bearing face 235, thus significantly reducing any contact stress at the outboard edge 86 in comparison with the prior art arrangement of FIGS. 2*a*-*f*. In FIGS. 5*b*-*c*, the bearing interface 239 is not necessarily laterally spaced from the outboard edge 86 as described in FIGS. 3*a*-*g* and 4*a*-*d*. Instead, the entire bearing face 235 contacts and bears against the outboard surface 80. However, it is noted that the longitudinally inwardly facing portion (i.e. bearing face 235) of the washer 230 is ramped and continuously variable in the longitudinal direction by depth 237.

As shown in FIG. 5*b*, washer 230 also includes a flat 257 to provide a visual feature allowing the washer 230 to be manually oriented so that bearing face 235 is circumferentially aligned with outboard surface 80. Alternatively, the flat 257 may mechanically key against a geometry feature (not shown) of the rim 70 that is adjacent the outer surface 80 to maintain this circumferential alignment.

Figure 5D:
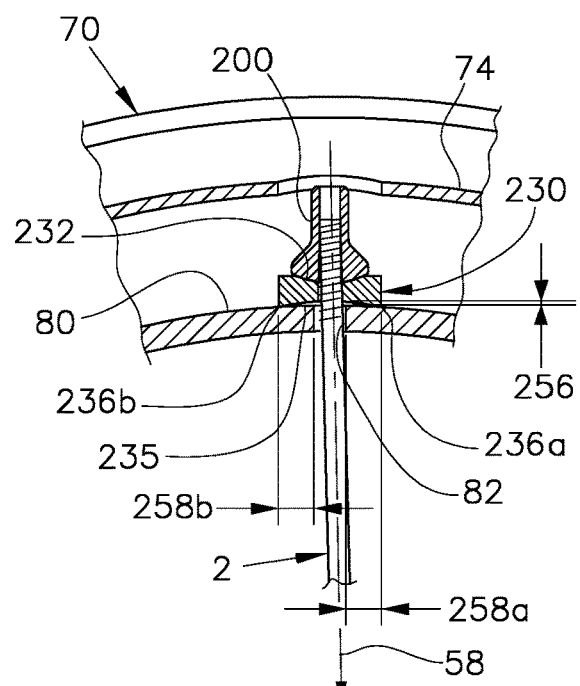
FIG. 5d is a partial radial plane cross section exploded detail view of the embodiment of FIG. 5a, with the spoke nipple, washer, and spoke next assembled within a spoke hole of the rim, and showing the circumferential radius of the bearing face as alternatively lesser than the circumferential radius of the outboard surface, thereby resulting in two circumferentially spaced bearing interfaces.

In the alternate case shown in FIG. 5*d*, where the circumferential radius 233 is less than the circumferential radius 238, the bearing face 235 and outboard surface 80 are nested such that the laterally outward edges 236*a* and 236*b* contact the outboard surface 80 at a bearing interfaces 239 therebetween, thus causing the laterally inward portion of the bearing surface 235 to be longitudinally spaced from the outer surface 80 adjacent the outboard edge 86, while the laterally outward portions of bearing face 235 contact the outboard surface 80 at two circumferentially spaced bearing interfaces 236*a* and 236*b* that circumferentially straddle the outboard edge 86 at a location laterally and circumferentially spaced from the outboard edge 86 by respective distances 258*a* and 258*b*. It is preferable that the recess depth 237 be at least 0.30 millimeters. The advantages and preferred specifications associated with bearing interface 239 of the embodiment of FIGS. 5*a*-*d* are identical to those described in the embodiment of FIGS. 3*a*-*e*.

Also, in the alternate case of FIG. 5*d*, it is understood that the spoke tension 58 induced in the spoke 2 may cause the washer 230 to flex slightly, causing gap 256 to be reduced and possibly eliminating gap 256 altogether. In such a case, the bearing interface would be similar to bearing interface 236 shown in FIG. 5*c*. However, due to the stiffness of the washer 230, the contact stresses would likely be greater adjacent the laterally outward regions of the bearing surface 235 (i.e. adjacent bearing interfaces 236*a* and 236*b*).

Due to radius 233, it is understood that FIGS. 5*a*-*d* describe an embodiment where the bearing face 235 is a circumferentially cylindrical surface that is gently sloped and longitudinally variable over a broad lateral distance to create a longitudinally outward portion thereof that is laterally adjacent the hole 234 and a longitudinally inward portion thereof that is laterally distal the hole 234. The bearing face 235 and corresponding bearing interface 239 occur between these longitudinally inward and outward portions. This is in contrast to the embodiments of FIGS. 5*g*-*h* where recess 246 shows a more pronounced stepped contour in the transition between recess 246 and bearing pads 243*a* and 243*b*.

Figure 5E:
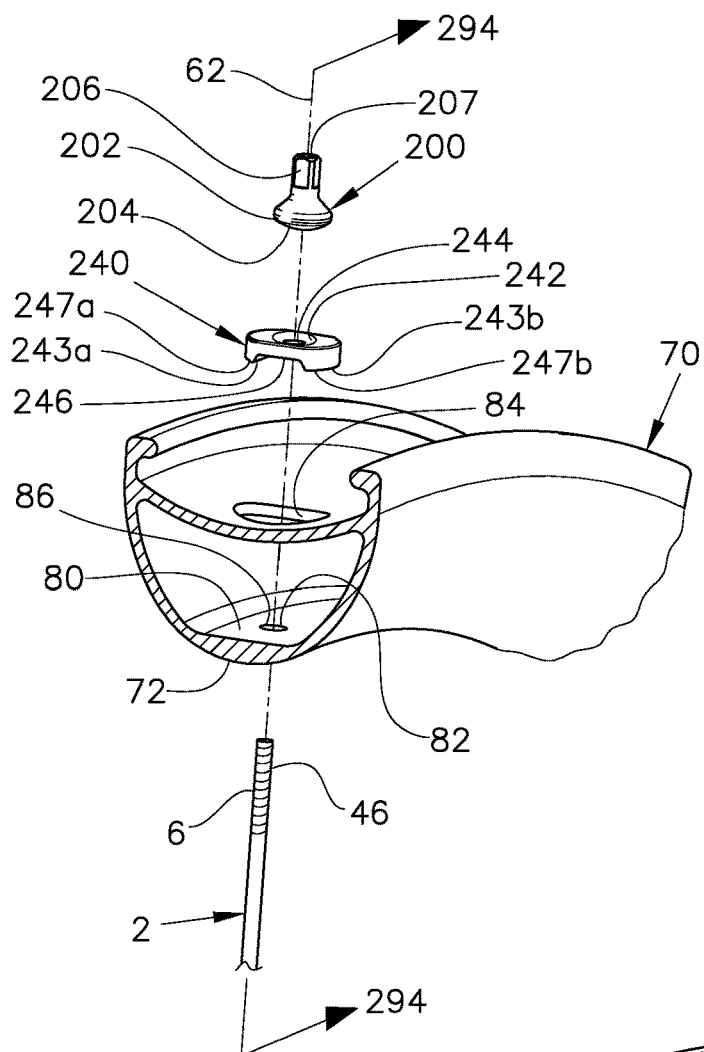
FIGS. 5e-f are partial perspective views, describing the sequential assembly steps involved in assembling a spoke to a rim.
Figure 5F:
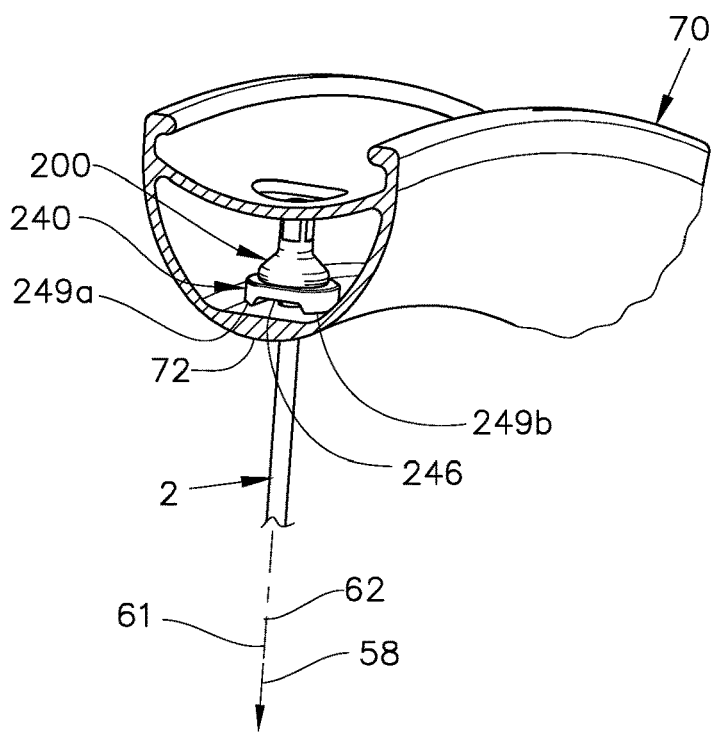
Figure 5G:
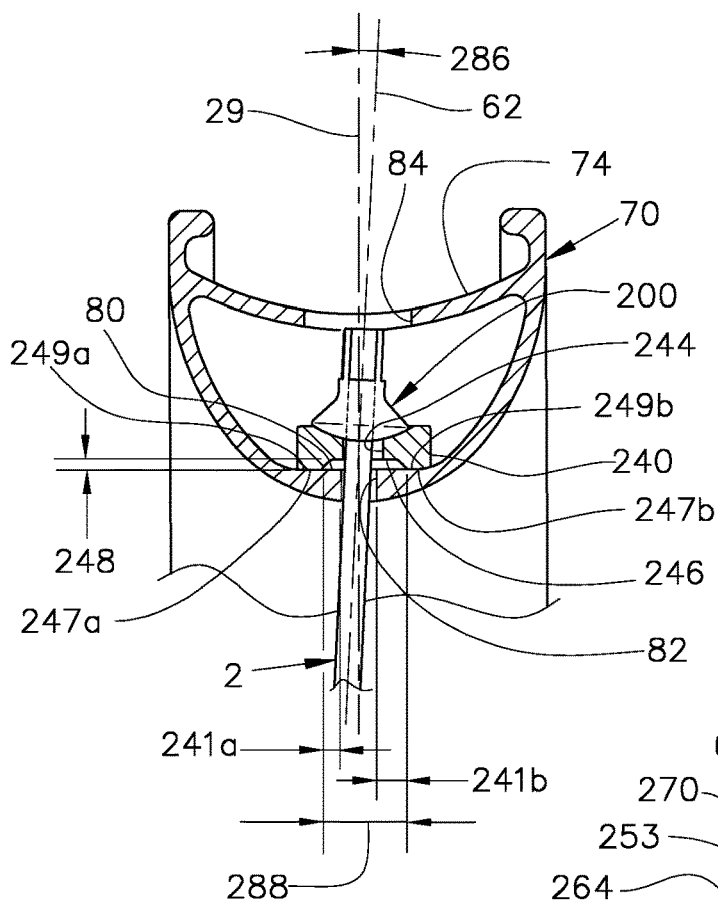
FIG. 5g is an axial plane cross-section detail view, taken along 294-294, of the embodiment of FIG. 5e and corresponding to the assembly sequence of FIG. 5f.

The embodiment of FIGS. 5*e*-*g* is similar to the embodiment of FIGS. 4*a*-*d*, with the exception that washer 210 is omitted in favor of washer 240. Rim 70, nipple 200, and spoke 2 are identical to those described in FIGS. 3*a*-*e*. Washer 240 includes: a hole 244 therethrough for passage of the second end 6 of the spoke 2, a longitudinally outwardly-facing spherically concave socket 242, and a longitudinally inwardly-facing underside face 245 with recess 246 that is laterally and axially flanked and straddled by longitudinally inwardly projecting bearing pads 243*a* and 243*b*, each with corresponding bearing surfaces 247*a* and 247*b* respectively. Bearing pads 243*a* and 243*b* project longitudinally inwardly from recess 246 by recess depth 248 and are laterally spaced by width 288. Hole 244 pierces the recess 246 and preferably does not encroach on bearing surfaces 247*a* and 247*b*.

As shown in FIGS. 5*e-g*, the spoke 2, washer 240, and nipple 200 are assembled to the rim 70 in the conventional manner, with internal threads 208 threadably assembled to external threads 46. Tightening this threadable assembly induces spoke pre-tension in the wheel in the conventional manner and serves to press bearing pads 243*a* and 243*b* against outboard surface 80. The convex spherical bearing face 204 is matched and nested with the concave spherical socket 242 in a ball-and-socket swivel arrangement, allowing the nipple 200 to be beneficially self-aligned with the span of the spoke 2 as shown and to accommodate a bracing angle 286 between longitudinal axis 61 and radial axis 29. The bearing surfaces 247*a* and 247*b* contact the outboard surface 80 and the washer 240 is oriented such that bearing surfaces 247*a* and 247*b* and bearing interfaces 249*a* and 249*b* axially flank and straddle the spoke hole 82 at axially spaced locations laterally outboard of the outboard edge 86 by respective distances 241*a* and 241*b*. Bearing surfaces 247*a* and 247*b* contact and abut the outboard surface 80 at a bearing interfaces 249*a* and 249*b* such that recess 246 bridges axially across and is spaced radially outboard of outboard edge 86 by distance 248. Bearing interfaces 249*a* and 249*b* constitute a plurality of discrete bearing surfaces. It is noted that distances 241*a* and 241*b* are not necessarily equal to each other, but both bearing interfaces 249*a* and 249*b* are shown here to be laterally outboard of the outboard edge 86. Alternatively, only one of bearing interfaces 249*a* or 249*b* may be laterally outboard of outboard edge 86 while the other may be laterally adjoining or overlapping outboard edge 86.

In contrast to bearing interface 222 of FIGS. 4*b* and 4*d*, which continuously circumscribe the spoke hole 82 about the longitudinal axis 62, bearing interfaces 249*a* and 249*b* instead discontinuously circumscribe the spoke hole 82 and axially straddle and flank the spoke hole 82 to only partially circumscribe the spoke hole 82. It preferable that the entirety of these plural bearing interfaces 249*a* and 249*b* are positioned to be laterally outwardly spaced from outboard edge 86. It is also preferable that the recess depth 248 be at least 0.30 millimeters. The advantages and preferred depth 248 specifications associated with bearing interfaces 249*a* and 249*b* of the embodiment of FIGS. 5*e-g* are identical to those described in the embodiment of FIGS. 3*a-e*. While the embodiments of FIGS. 3*a-e* and 4*a-d* show their respective bearing surfaces 104 and 220 as laterally surrounding and circumscribing the spoke hole 82 of the rim 70, the embodiment of FIGS. 5*a-g* show the recess 246 as only partially laterally surrounded by bearing pads 243*a* and 243*b*. Bearing surfaces 247*a* and 247*b* do not fully circumscribe the longitudinal axis 62 and the corresponding bearing interfaces 249*a* and 249*b* constitute two separated and discrete bearing interfaces with a lateral gap in between. Bearing surfaces 247*a* and 247*b* are shown to abut, press and bear against outboard surface 80 at corresponding bearing interfaces 249*a* and 249*b* that are laterally spaced from the spoke hole 83 in the manner described in FIG. 3*f*. Recess 246 serves to bridge and span over the outboard edge 86 as shown.

Figure 5H:
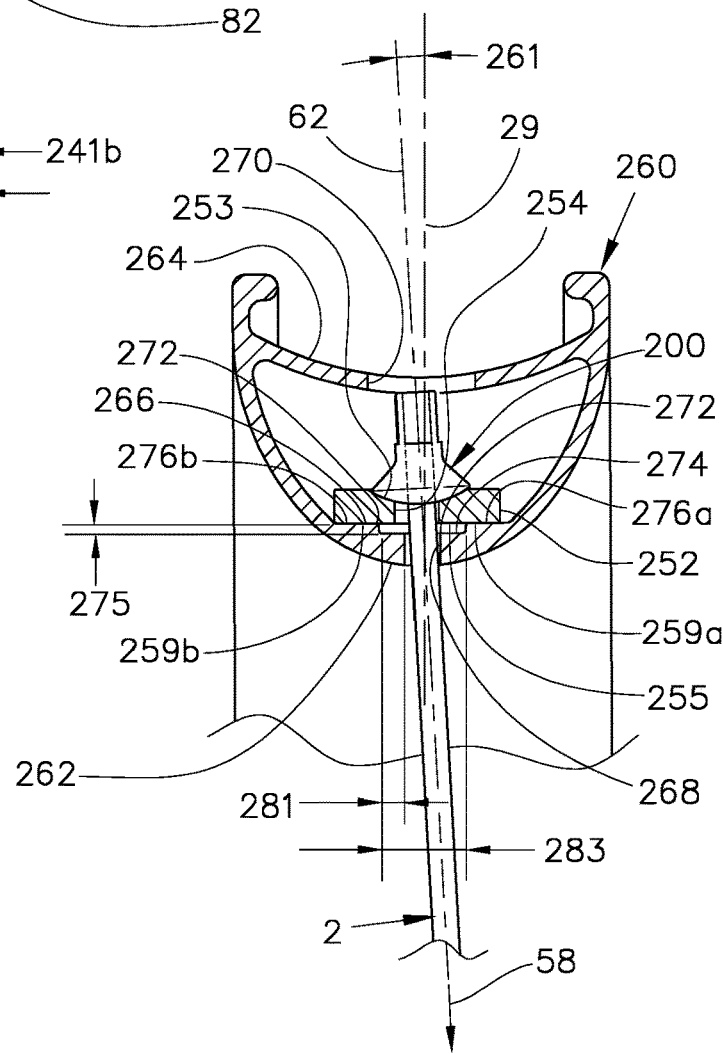
FIG. 5h is a cross-section detail view of a seventh embodiment of the present invention, with the rim shown in axial plane cross section, including a spoke reinforcement washer having a generally flat bearing face and a rim having a stepped outer surface with a recessed portion that laterally straddles the spoke hole. The view of FIG. 5h corresponds to the view of FIG. 5g.

The embodiment of FIG. 5*h* is similar to the embodiment of FIGS. 5*e-g*, with the exception that washer 240 is omitted in favor of washer 252 and rim 260 includes a radial step in the outboard surface 266. Instead of the nipple and/or the washer having a recess and a longitudinal step, as described in the previous embodiments, the washer 252 has a generally flat bearing face 255 and the outboard surface 266 is stepped to permit the bearing interfaces 259*a* and 259*b* to laterally straddle the spoke hole 268 such that the washer 252 may bridge across and be spaced longitudinally outwardly from the outboard edge 272. Nipple 200 and spoke 2 are both identical to those described in FIGS. 3*a-e*.

Washer 252 includes: a hole 254 therethrough for passage of the second end 6 of the spoke 2, a longitudinally outwardly-facing spherically concave socket 253, and a longitudinally inwardly-facing bearing face 255 that is shown to be generally flat (in contrast to the recess 246 described in FIGS. 5*e-g*).

Rim 260 is similar to rim 70 and includes a spoke bed 262 and a tire bed 264 with access hole 270 therethrough. Unlike rim 70, the spoke bed 262 includes an outboard surface 266 that is stepped to include a longitudinally inwardly recessed surface 274 of width 283 that is axially straddled by bearing surfaces 276*a* and 276*b*, which are longitudinally outboard of the recessed surface 274 by recess depth 275. The lateral width 283 between bearing surfaces 276*a* and 276*b* is wider than the diameter of the spoke hole 268 such that the outboard edge 272 is positioned to be laterally inboard or coincident with respect to the bearing surfaces 276*a* and 276*b*.

As shown in FIG. 5*h*, the spoke 2, washer 252, and nipple 200 are assembled to the rim 260 in the conventional manner, with internal threads 208 threadably assembled to external threads 46. Tightening this threadable assembly induces spoke pre-tension in the wheel in the conventional manner. The convex spherical bearing face 204 is matched and nested with concave spherical socket 253 in a ball-and-socket swivel arrangement, allowing the nipple 200 to be beneficially self-aligned with the span of the spoke 2 as shown to accommodate a bracing angle 261 as shown. The bearing face 255 contacts the spoke bed 262 at bearing surfaces 276*a* and 276*b* that are radially outwardly spaced (by recess depth 275) from the recessed surface 274 to axially straddle the spoke hole 268 at locations laterally outboard of the outboard edge 272. Bearing surfaces 276*a* and 276*b* contact and abut the bearing face 255 at respective bearing interfaces 259*a* and 259*b* such that bearing face 255 bridges across and is spaced laterally and longitudinally outboard of outboard edge 272. Bearing interface 259*a* is laterally outboard of outboard edge 272 by distance 281. It is preferable that the recess depth 275 be at least 0.30 millimeters. It is seen that bearing surfaces 276*a* and 276*b* contact only a portion of bearing face 255. The advantages and preferred depth 275 specifications associated with bearing interfaces 259*a* and 259*b* of the embodiment of FIG. 5*h* are identical to those described in the embodiment of FIGS. 3*a-e*.

What is claimed is:
1. A vehicle wheel, comprising:
an outer rim;
a central hub with a central axle and an outer flange;
a plurality of spokes extending between the rim and hub, wherein at least one of said spokes has a first portion thereof connected to said rim and a second portion thereof opposed to said first portion and connected to said hub, and a longitudinal axis along said spoke;

wherein said outer rim includes a spoke bed wall with: a radially outboard surface; and a spoke hole therethrough having a radially outboard first entrance having a first perimeter edge;

wherein said spoke includes a laterally projecting engagement flange having a longitudinally inwardly facing engagement surface; said engagement surface is longitudinally variable to include a recess surface laterally adjacent said spoke hole and a bearing surface laterally outboard and longitudinally inboard of said recess surface;

wherein said spoke extends through said spoke hole and is engaged to said spoke bed wall by means of an overlie engagement at a bearing interface directly between said bearing surface and said radially outboard surface to limit longitudinally inward displacement between said first portion and said spoke bed wall;

wherein said recess surface is longitudinally outwardly spaced from said radially outboard surface to maintain a longitudinal gap therebetween;

wherein at least a portion of said bearing interface is laterally outwardly spaced from said first perimeter edge by a first lateral distance; and wherein said first lateral distance is at least 0.7 millimeters.

2. The vehicle wheel according to claim 1, wherein said first lateral distance is at least 1.0 millimeters.

3. The vehicle wheel according to claim 1, wherein said first lateral distance is at least 1.3 millimeters.

4. The vehicle wheel according to claim 1, wherein said first lateral distance is a generally circumferential distance.

5. The vehicle wheel according to claim 1, wherein said first lateral distance is a generally axial distance.

6. The vehicle wheel according to claim 1, wherein said bearing surface circumscribes said spoke hole.

7. The vehicle wheel according to claim 1, wherein the entirety of said bearing interface is laterally outwardly spaced from said first perimeter edge by at least 0.7 millimeters.

8. The vehicle wheel according to claim 1, wherein said bearing interface circumscribes said spoke hole about said longitudinal axis.

9. The vehicle wheel according to claim 1, wherein said bearing interface only partially circumscribes said spoke hole about said longitudinal axis.

10. The vehicle wheel according to claim 1, including a plurality of said bearing interfaces, including a first bearing interface and a second bearing interface discrete from said first bearing interface, wherein at least one of: (i) said first bearing interface and said second bearing interface circumferentially straddle said spoke hole; and (ii) said first bearing interface and said second bearing interface axially straddle said spoke hole.

11. The vehicle wheel according to claim 10, wherein both said first bearing interface and said second bearing interface are laterally outwardly spaced from said first perimeter edge.

12. The vehicle wheel according to claim 1, wherein said bearing surface is a flat planar bearing surface and wherein said radially outboard surface is radially variable such that said bearing surface contacts said radially outboard surface at two discrete bearing interface locations.

13. The vehicle wheel according to claim 1, wherein said bearing surface is in an intermediate element connected to said spoke.

14. The vehicle wheel according to claim 13, wherein said intermediate element is a spoke nipple directly connected to said spoke by a threadable engagement.

15. The vehicle wheel according to claim 14, wherein said spoke nipple is an internal spoke nipple.

16. The vehicle wheel according to claim 13, wherein said intermediate element is a first intermediate element, and including a second intermediate element, wherein said spoke is engaged to said first intermediate element and said first intermediate element is engaged to said second intermediate element to limit longitudinally inward displacement of said first portion relative to said rim.

17. A vehicle wheel, comprising:
an outer rim;
a central hub with a central axle and an outer flange;
a plurality of spokes extending between the rim and hub, wherein at least one of said spokes have a first portion connected to said rim and a second portion opposed to said first portion and connected to said hub, and a longitudinal axis along said spoke;
an intermediate element connected to said spoke;
wherein said outer rim includes a spoke bed wall with: a radially outboard surface; and a spoke hole therethrough having a radially outboard first entrance having a first perimeter edge and a radially inboard second entrance;
wherein said spoke includes a laterally projecting engagement flange having a longitudinally inwardly facing engagement surface; said engagement surface is longitudinally variable to include a recess surface laterally adjacent said spoke hole and a bearing surface laterally outboard and longitudinally inboard of said recess surface;
wherein said recess surface is longitudinally outwardly spaced from said radially outboard surface to maintain a longitudinal gap therebetween;
wherein said spoke extends through said spoke hole and includes a laterally projecting engagement flange that is engaged to said spoke bed wall by means of an overlie engagement at a first bearing interface directly between a first portion of said engagement flange and said radially outboard surface; and a second bearing interface directly between a second portion of said engagement flange and said radially outboard surface; and
wherein said first bearing interface and said second bearing interface at least one of: (i) circumferentially straddle said first entrance and (ii) axially straddle said first entrance.

18. The vehicle wheel according to claim 17, wherein said first bearing interface is discrete from said second bearing interface.

19. The vehicle wheel according to claim 17, wherein at least a portion of said first bearing interface is laterally outwardly spaced from said first perimeter edge by at least 0.7 millimeters and at least a portion of said second bearing interface is laterally outwardly spaced from said first perimeter edge by at least 0.7 millimeters.

20. A vehicle wheel, comprising:
an outer rim;
a central hub with a central axle and an outer flange;
a plurality of spokes extending between the rim and hub, wherein at least one of said spokes have a first portion thereof connected to said rim and a second portion thereof opposed to said first portion and connected to said hub, and a longitudinal axis along said spoke;
an intermediate element connected to said spoke;
wherein said outer rim includes a spoke bed wall with: a radially outboard surface; and a spoke hole therethrough having a radially outboard first entrance having a first perimeter edge;

wherein said intermediate element includes a laterally projecting engagement flange having a longitudinally inwardly facing engagement surface; said engagement surface is longitudinally variable to include a recess surface laterally adjacent said spoke hole and a bearing surface laterally outboard and longitudinally inboard of said recess surface;

wherein said spoke extends through said spoke hole and is engaged to said spoke bed wall by means of an overlie engagement at a bearing interface directly between said bearing surface and said radially outboard surface to limit longitudinally inward displacement between said first portion and said spoke bed wall; and wherein said recess surface is longitudinally outwardly spaced from said radially outboard surface to maintain a longitudinal gap therebetween.

21. The vehicle wheel according to claim 20, wherein said longitudinal gap is at least 0.3 millimeters and said bearing interface is laterally outwardly spaced from said first perimeter edge by at least 0.7 millimeters.

22. The vehicle wheel according to claim 20, wherein said bearing surface is circumferentially matched to said outboard surface.

23. The vehicle wheel according to claim 20, wherein said intermediate element is connected to only a singular one of said spokes.

* * * * *